US011190341B2

(12) United States Patent
Williams et al.

(10) Patent No.: US 11,190,341 B2
(45) Date of Patent: Nov. 30, 2021

(54) SYSTEM ARCHITECTURE FOR EXECUTING A DISTRIBUTED KEY GENERATION PROTOCOL

(71) Applicant: DFINITY Stiftung, Zug (CH)

(72) Inventors: Dominic Williams, Palo Alto, CA (US); Timo Hanke, Palo Alto, CA (US); Mahnush Movahedi, Menlo Park, CA (US)

(73) Assignee: DFINITY Stiftung, Zug (CH)

( * ) Notice: Subject to any disclaimer, the term of this patent is extended or adjusted under 35 U.S.C. 154(b) by 194 days.

(21) Appl. No.: 16/259,718

(22) Filed: Jan. 28, 2019

(65) Prior Publication Data

US 2019/0238318 A1   Aug. 1, 2019

Related U.S. Application Data

(60) Provisional application No. 62/622,169, filed on Jan. 26, 2018.

(51) Int. Cl.
*H04L 29/06* (2006.01)
*H04L 9/06* (2006.01)
(Continued)

(52) U.S. Cl.
CPC .......... *H04L 9/0637* (2013.01); *H04L 9/0643* (2013.01); *H04L 9/085* (2013.01);
(Continued)

(58) Field of Classification Search
CPC ....... H04L 9/085; H04L 63/12; H04L 9/3239; H04L 9/0643; H04L 63/061; H04L 9/0637; H04L 9/3255; H04L 2209/38
See application file for complete search history.

(56) References Cited

U.S. PATENT DOCUMENTS

| 2011/0083015 A1* | 4/2011 | Meier | H04L 9/3236 |
| | | | 713/176 |
| 2016/0342977 A1* | 11/2016 | Lam | G06Q 20/0658 |
| 2017/0048217 A1* | 2/2017 | Biggs | H04L 63/123 |

FOREIGN PATENT DOCUMENTS

WO    2018094299 A2    5/2018

OTHER PUBLICATIONS

International Search Report and Written Opinion dated Jul. 5, 2019 for PCT/IB2019/000101 (13 pages).
(Continued)

*Primary Examiner* — Harunur Rashid
(74) *Attorney, Agent, or Firm* — Brown Rudnick LLP; Adam M. Schoen

(57) ABSTRACT

A software architecture encoded on a non-transitory computer readable medium, where the software architecture includes a creation protocol, wherein the creation protocol is configured to create a plurality of dealing messages. The software architecture additionally includes a reading protocol, wherein the reading protocol is configured to read the dealing message to a receiver node of the selected group, wherein the receiver node is different from a dealer node whose information is contained in the corresponding dealing message. Moreover, the software architecture includes a verification protocol, wherein the verification protocol is configured to verify veracity of the corresponding dealing message, wherein the verification protocol is configured to be run by the receiver node. Further, the software architecture includes a complaint protocol, wherein the complaint protocol is configured to generate a complaint message, wherein the complaint message is signed by the receiver node.

28 Claims, 17 Drawing Sheets

(51) Int. Cl.
H04L 9/32 (2006.01)
H04L 9/08 (2006.01)

(52) U.S. Cl.
CPC .......... *H04L 9/3239* (2013.01); *H04L 9/3255* (2013.01); *H04L 63/061* (2013.01); *H04L 63/12* (2013.01); *H04L 2209/38* (2013.01)

(56) References Cited

OTHER PUBLICATIONS

Rev Hanke Timo et al.: "DFINITY Technology Overview Series Consensus System", Jan. 23, 2018, URL: https://dfinity.org/pdf-viewer/library/dfinity-consensus.pdf.
Neji et al.: "Distributed key generation protocol with a new complaint management strategy . . . " Security and Communication Networks, vol. 9, No. 17, Nov. 25, 2016, pp. 4585-4595.
Gennaro et al., "Secure Distributed Key Generation for Discrete-Log Based Cryptosystems", Journal of Cryptology, Springer-Verlag, NE, vol. 20. 20, No. 1, May 24, 2006, pp. 51-83.
Hanke et al.: "DFINITY", Jan. 26, 2018, Retrieved from the Internet: URL:https://cyber.stanford.edu/sites/g/files/sbiybj9936/f/bpase18_master.pdf [retrieved on Jun. 26, 2019] Slides 76-89.

* cited by examiner

SYSTEM ARCHITECTURE FOR EXECUTING A DISTRIBUTED KEY GENERATION PROTOCOL

CROSS-REFERENCE TO RELATED APPLICATIONS

The present U.S. patent application is related to and claims the priority benefit of U.S. Provisional Patent Application Ser. No. 62/622,169, filed Jan. 26, 2018, the contents of which is hereby incorporated by reference in its entirety into this disclosure.

BACKGROUND

This section introduces aspects that may help facilitate a better understanding of the disclosure. Accordingly, these statements are to be read in this light and are not to be understood as admissions about what is or is not prior art.

Conventional system architectures, especially for blockchain operations, have issues related to computational and operation speed, architecture security, participation scalability, and many others. Various embodiments of the present disclosure address the above issues.

SUMMARY

One aspect of the present application relates to a software architecture encoded on a non-transitory computer readable medium, where the software architecture includes a creation protocol, wherein the creation protocol is configured to create a plurality of dealing messages. The software architecture additionally includes a reading protocol, wherein the reading protocol is configured to read the dealing message to a receiver node of the selected group, wherein the receiver node is different from a dealer node whose information is contained in the corresponding dealing message. Moreover, the software architecture includes a verification protocol, wherein the verification protocol is configured to verify veracity of the corresponding dealing message, wherein the verification protocol is configured to be run by the receiver node. Further, the software architecture includes a complaint protocol, wherein the complaint protocol is configured to generate a complaint message, wherein the complaint message is signed by the receiver node.

Another aspect of the present application relates to a software architecture encoded on a non-transitory computer readable medium, the software architecture includes a creation protocol, wherein the creation protocol is configured to create a plurality of dealing messages, wherein each dealing message of the plurality of dealing messages includes information from each dealer node in a selected group of a plurality of groups. Additionally, the software architecture includes a fifth protocol, wherein the fifth protocol is configured to broadcast a plurality of blocks to a network, wherein each block of the plurality of blocks comprises a dealing message of the plurality of dealing messages. Moreover, the software architecture includes a reading protocol, wherein the reading protocol is configured to read the dealing message to a receiver node of the selected group, wherein the receiver node is different from a dealer node whose information is contained in the corresponding dealing message. Further, the software architecture includes a verification protocol, wherein the verification protocol is configured to verify veracity of the corresponding dealing message, wherein the verification protocol is configured to be run by the receiver node. Moreover, the software architecture incudes a complaint protocol, wherein the complaint protocol is configured to generate a complaint message, wherein the complaint message is signed by the receiver node, and wherein the complaint protocol is configured to be run by the receiver node. The software architecture includes a justification protocol, wherein the justification protocol is configured to create a justification message, wherein the justification message includes justifications to the complaint message, wherein the dealer node is configured to run the justification protocol to create the justification message. The software architecture further includes a registration protocol, wherein the registration protocol is configured to consolidate a plurality of dealing messages of the selected group, wherein the registration protocol is run by the each receiver node.

Still another aspect of the present application relates to a software architecture encoded on a non-transitory computer readable medium, the software architecture includes a first protocol, wherein the first protocol is configured to form a plurality of groups, wherein each group of the plurality of groups includes a set of randomly selected nodes from a network. The software architecture also includes a creation protocol, wherein the creation protocol is configured to create a plurality of dealing messages, wherein each dealing message of the plurality of dealing messages includes information from each dealer node in a selected group of the plurality of groups. Additionally, the software architecture includes a fifth protocol, wherein the fifth protocol is configured to broadcast a plurality of blocks to a network, wherein each block of the plurality of blocks comprises a dealing message of the plurality of dealing messages. Moreover, the software architecture includes a reading protocol, wherein the reading protocol is configured to read the dealing message to a receiver node of the selected group, wherein the receiver node is different from a dealer node whose information is contained in the corresponding dealing message. Further, the software architecture includes a verification protocol, wherein the verification protocol is configured to verify veracity of the corresponding dealing message, wherein the verification protocol is configured to be run by the receiver node. Moreover, the software architecture incudes a complaint protocol, wherein the complaint protocol is configured to generate a complaint message, wherein the complaint message is signed by the receiver node, and wherein the complaint protocol is configured to be run by the receiver node. The software architecture includes a justification protocol, wherein the justification protocol is configured to create a justification message, wherein the justification message includes justifications to the complaint message, wherein the dealer node is configured to run the justification protocol to create the justification message. The software architecture further includes a registration protocol, wherein the registration protocol is configured to consolidate confirmation of a plurality of justified public keys, wherein each justified public key of the plurality of justified public keys corresponds to the each dealing message, wherein the verification protocol has accepted veracity of each justified public key of the plurality of justified public keys.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

DETAILED DESCRIPTION

Figure 1:
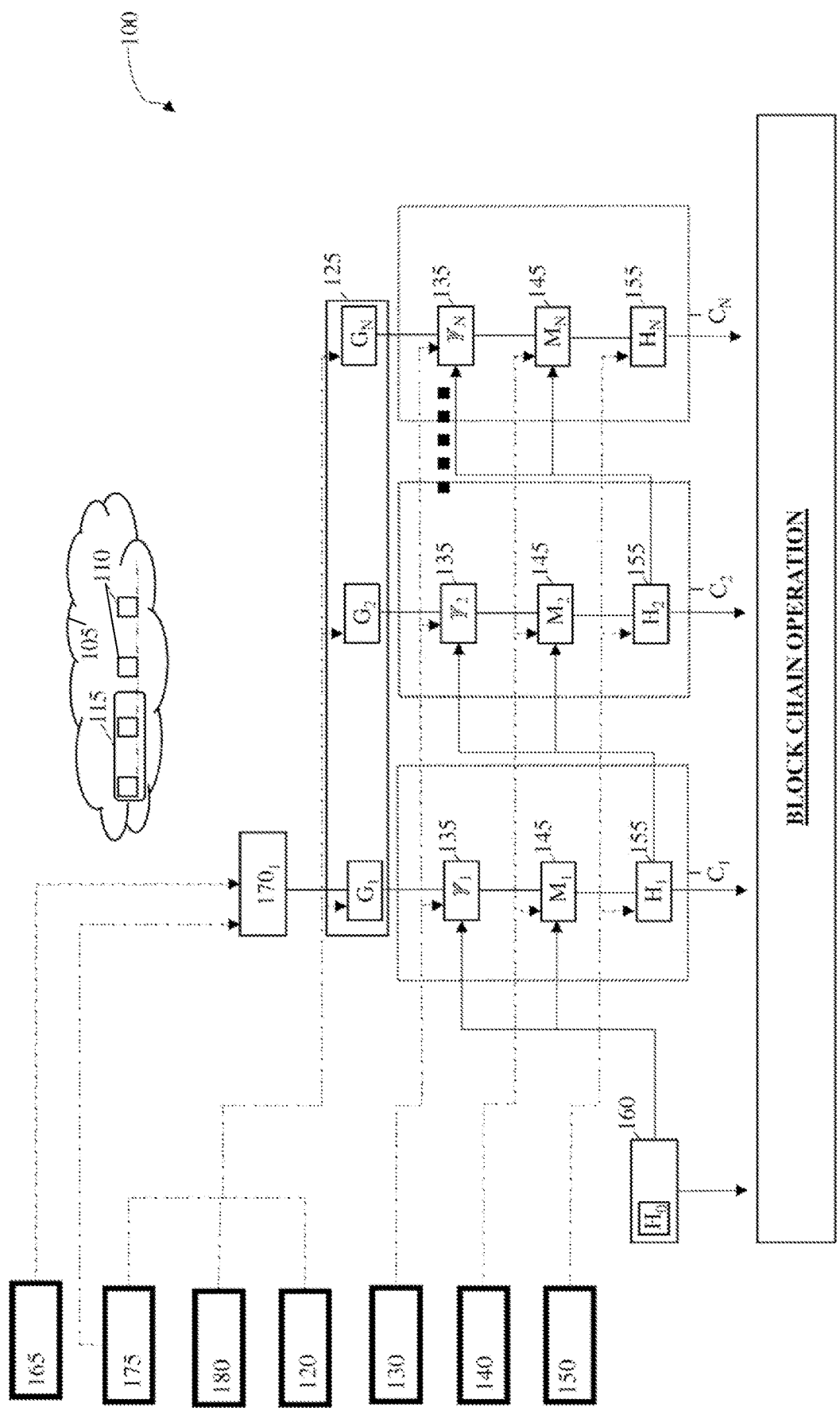
FIG. 1 illustrates a system architecture of a threshold relay chain according to one or more embodiments.

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Various embodiments of the present disclosure related to a system architecture that uses a secure and performant consensus mechanism that can be deployed in any participation model—open or permissioned. According to various embodiments, the system architecture includes a decentralized randomness beacon which acts as a verifiable random function that produces a stream of outputs over time. Using the decentralized randomness beacon which includes a threshold signature scheme, there ends up being a low variance in block maker selection, and thereby resulting in an increased speed of computation as far as block creation is concerned. Additionally, the decentralized randomness beacon is configured to produce a random sequence that is unpredictable, unstoppable, and verifiable, thereby preserving the sanctity of an associated system, along with increasing security therein.

Using the decentralized randomness beacon with a threshold relay mechanism results in an architecture that can scale up to a very large number of participants, thereby bolstering a capacity of the architecture. Since various embodiments of the architecture only requires a single round of non-interactive messaging per random beacon output, the computational speed of such architecture remains unhindered. Moreover, the threshold relay mechanism only selects among registered block makers, according to one or more embodiments. Such ecosystem permits unbounded penalty for misbehaving blocks makers, because such misbehaving block makers may not only lose their nomination, but also get disqualified and lose the monetary value associated with the nomination. This would not only deter misbehavior, but also further increase the security of the associated system.

Additionally, in order to further increase the architectural security of the ecosystem, various embodiments of the present disclosure relate to a system architecture for executing a distributed key generation procedure protocol (discussed below) in order to confirm that only honest nodes participate in the above ecosystem. In various embodiments, the distributed key generation procedure protocol operates based on strategically transacting messages between a set of dealer nodes and a set of receiver nodes. A dealer node sends a dealing message to at least one receiver. The dealing message includes an encrypted key share from the dealer node. The dealer node creates a separate encrypted key share for each receiver node, such that all the receiver nodes receive separate encrypted keys. This allows all the receiver nodes to individually verify the encrypted key share it receives from the dealer node, relative to a verification vector of the dealer node. In the event the receiver node is unable to verify, various protocols are instituted to ensure that a decrypted key share from the dealer node is broadcasted onto the network. Only dealer nodes whose key share is verified against the verification vector are considered honest nodes, and thereby allowed to participate in the above ecosystem. The above procedure helps in checking a commitment of the dealer node by individually verifying the encrypted key share relative to a verification vector, thereby confirming that only the honest (dealer) nodes participate in the above ecosystem. Various embodiments of the present application relate to effectuating the above, and thereby ensuring that the security of the network is maintained.

In various embodiments, the threshold relay mechanism also adapts a ranking mechanism which provides tighter bounds/estimates on weights of unseen adversarial forks compared to conventional methodologies, thereby resulting in faster and more accurate chain selection when dealing with multiple forks. Additionally, the threshold relay mechanism provides finality of blocks through notarization, which results in near-instant finality for new blocks.

FIG. 1 illustrates a system architecture of a threshold relay chain 100 according to one or more embodiments. Threshold relay chain 100 is configured to communicate with a universal network 105. Universal network 105 includes multiple nodes 110, where each node of multiple nodes 110 is configured to interact with each other via a communication channel. The communication channel includes at least one of a peer-to-peer network, a broadcast network, or a gossip network. A network 115 includes two or more nodes 110. A sixth protocol 165 is configured to nominate a plurality of nodes $170_1$ from universal network 105. A first protocol 120 is configured to form a plurality of groups 125, where each group (125; $G_1$, $G_2$ . . . $G_N$) of plurality of groups 125 includes a set of randomly selected nodes from network 115. In various embodiments, each group (125; $G_1$, $G_2$ . . . $G_N$) of plurality of groups 125 are part of the plurality of nodes $170_1$. In at least one embodiment, network 115 is universal network 105. In at least one embodiment, a system architecture for executing a distributed key generation procedure protocol (discussed below) is run in order to confirm that only honest nodes participate in the above ecosystem.

A second protocol 130 is configured to randomly select a first group (135, $\gamma_1$). A third protocol 140 is configured to designate first group (135, $\gamma_1$) to sign a first message (145, $M_1$) by generating a first group signature. A hash function 150 is configured to generate a hash value (155, $H_1$) from the first group signature. A size of first group (135, $\gamma_1$) is a system parameter. In at least one embodiment, hash value (155, $H_1$) is configured to select a second group (135, $\gamma_2$) using second protocol 130, where third protocol 140 is configured to designate second group (135, $\gamma_2$) to sign a second message (145, $M_2$).

In various embodiments, the first group signature is configured to be generated by a threshold set of first group (135, $\gamma_1$). In some embodiments, the threshold set is smaller than a size of first group (135, $\gamma_1$). In some embodiments, the threshold set is equal to a size of first group (135, $\gamma_1$). In at least one embodiment, the threshold set of first group (135, $\gamma_1$) is a system parameter.

In various embodiments, first message (145, $M_1$) is concatenated with a random number. In some embodiments, the random number is a value derived from a seed 160. In some embodiments, seed 160 is derived from a preceding group signature. In at least one embodiment, the derivation of seed 160 from the preceding group signature is by hash function 150. In at least one embodiment, the first message is a system parameter.

As previously discussed, second protocol 130 is configured to randomly select first group (135, $\gamma_1$). In various embodiments, such selection is based on a random number. In some embodiments, the random number is a value derived from a seed 160. In some embodiments, seed 160 is derived from the preceding group signature. In at least one embodiment, the derivation of seed 160 from the preceding group signature is by hash function 150.

Threshold relay chain 100 further includes a setup protocol 180, wherein setup protocol 180 is configured to establish a group public key for the group of the plurality of groups 125 formed by first protocol 120, wherein the first group signature is configured to be validated by the group public key. In at least one embodiment, the first group signature is configured to be unique to the group public key and first message (145, $M_1$), irrespective to idiosyncrasies of the threshold set of first group (135, $\gamma_1$). In some embodiments, the first group signature is based on at least one of bilinear pairings, bilinear pairings on elliptic curves, threshold scheme, Gap Diffie-Hellman groups (GDH) or Boneh-Lynn-Shacham (BLS) signature scheme.

In one or more embodiments, setup protocol 180 is configured to establish an individual private key share for each node of each group (125; $G_1$, $G_2$ . . . $G_N$) of plurality of groups 125. According to at least one embodiment, the individual private key shares of each of the nodes of a threshold set of first group (135, $\gamma_1$) are configured to be used for generating the first group signature. In some embodiments, the threshold set is smaller than a size of first group (135, $\gamma_1$). In some embodiments, the threshold set is equal to a size of first group (135, $\gamma_1$). In at least one embodiment, the threshold set of first group (135, $\gamma_1$) is a system parameter.

As previously discussed, threshold relay chain 100 includes sixth protocol 165, where sixth protocol 165 is configured to nominate plurality of nodes $170_1$ from universal network 105. In one or more embodiments, the set of randomly selected nodes are part of plurality of nodes $170_1$. In some embodiments, sixth protocol 165 is configured to adapt a methodology for nominating plurality of nodes $170_1$, wherein the methodology includes at least one of a proof-of-work puzzle, an external third-party endorsement, or a validation of computational resources. In some embodiments, sixth protocol 165 is configured to assess a monetary value and/or voting rights associated with each node of plurality of nodes $170_1$.

Threshold relay chain 100 further includes a seventh protocol 175, wherein seventh protocol 175 is configured to detect misbehavior of a select node of the set of randomly selected and/or the plurality of nodes. In some embodiments, seventh protocol 175 is configured to penalize the select node. In some embodiments, seventh protocol 175 is configured to revoke a nomination of the select node.

As illustrated in FIG. 1, various protocols and functions of threshold relay chain 100 are configured to cater to multiple cycles (i.e. $C_1$, $C_2$ . . . $C_N$) of data management and processing contemporaneously. Second protocol 130 along with hash value (155, $H_1$) are configured to select second group (135, $\gamma_2$), where third protocol 140 is configured to designate second group (135, $\gamma_2$) to sign a second message (145, $M_2$). In some embodiments, second message (145, $M_2$) includes hash value (155, $H_1$) of the first group signature. In some embodiments, second message (145, $M_2$) is devoid of hash value (155, $H_1$) of the first group signature.

According to one or more embodiments, second protocol 130 along with hash value (155, $H_N$) are configured to select (N+1)th group (135, $\gamma_{N+1}$), where third protocol 140 is configured to designate (N+1)th group (135, $\gamma_{N+1}$) to sign (N+1)th message (145, $M_{N+1}$). Hash function 150 is configured to generate a hash value (155, $H_{N+1}$) from the (N+1)th group signature. In some embodiments, (N+1)th message (145, $M_{N+1}$) includes hash value (155, $H_N$) of the N-th group signature. In some embodiments, (N+1)th message (145, $M_{N+1}$) is devoid of hash value (155, $H_N$) of the N-th group signature.

Figure 1A:
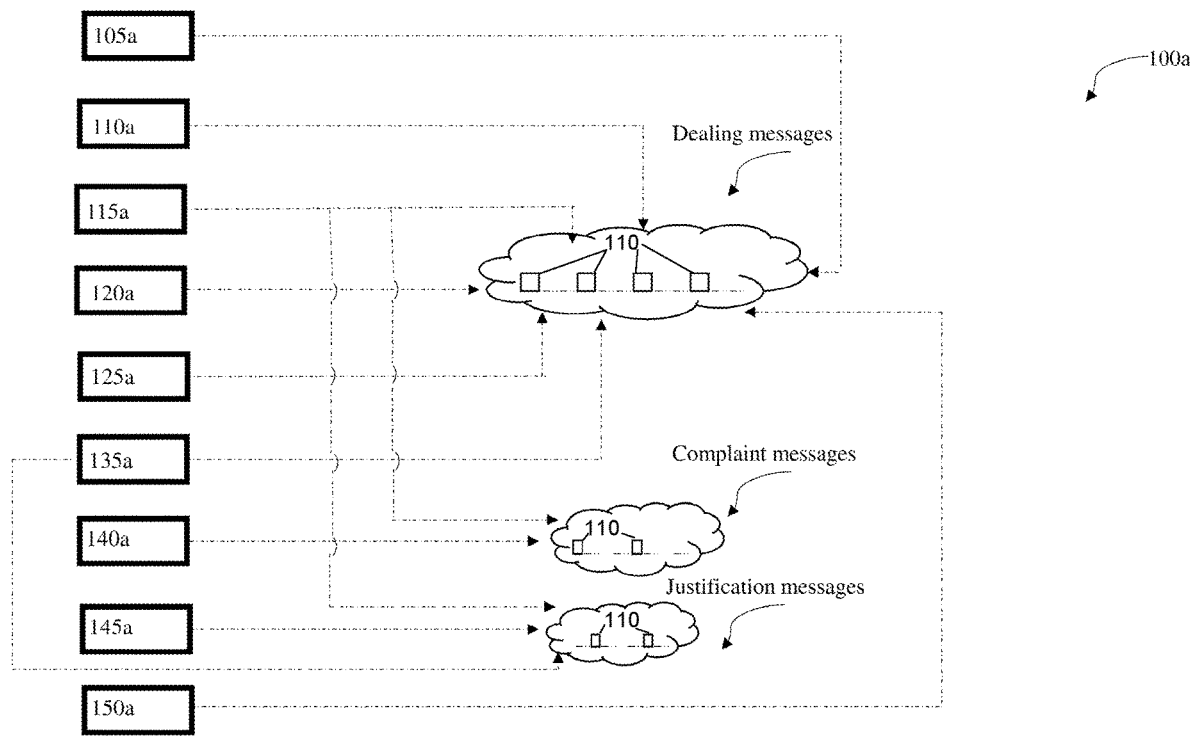
FIG. 1a illustrates a system architecture for executing the distributed key generation procedure 100a over a blockchain.

Various embodiments of the present disclosure relate to a system architecture for executing a methodology before second protocol 130 randomly selects the first group from the plurality of groups formed by first protocol 120. In order for second protocol 130 to randomly select the first group, said first group must satisfy a conformity of a distributed key generation procedure over a blockchain. FIG. 1a illustrates a system architecture for executing the distributed key generation procedure 100a over a blockchain. The system architecture for distributed key generation procedure 100a is configured to nullify malicious nodes that may broadcast false information within the first group. In some embodiments, distributed key generation procedure 100a is executed after first protocol 120 forms the plurality of groups.

As previously indicated, each group of the plurality of groups includes the set of randomly selected nodes from the network. The system architecture for distributed key generation procedure 100a includes a creation protocol 105a, wherein creation protocol 105a is configured to create a plurality of dealing messages. Creation protocol 105a is run by at least one dealer node. The system architecture for distributed key generation procedure 100a further includes a hash function 110a, wherein hash function 110a is configured to generate a hash value from the each dealing message of the plurality of dealing messages. Additionally, the system architecture for distributed key generation procedure 100a includes a fifth protocol 115a, wherein fifth protocol 115a is configured to broadcast a plurality of blocks to the network of the blockchain. Moreover, the system architecture for distributed key generation procedure 100a includes a fourth protocol 120a, wherein fourth protocol 120a is configured to notarize the each block of the plurality of blocks. Further, the system architecture for distributed key generation procedure 100a includes a reading protocol 125a, wherein reading protocol 125a is configured to read the dealing message to a receiver node of the selected group.

In one or more embodiments, each dealing message of the plurality of dealing messages includes information from each dealer node in a selected group of the plurality or groups. In some embodiments, each block of the plurality of blocks includes a dealing message of the plurality of dealing messages. In some embodiments, each block of the plurality of blocks includes at least two dealing messages of the plurality of dealing messages. In at least one embodiment, the receiver node is different from a dealer node whose information is contained in the corresponding dealing message. In some embodiments, the hash value is a root of a Merkle tree of the plurality of dealing messages. In at least one embodiment, the hash value is incorporated in a block of the plurality of blocks.

The system architecture for distributed key generation procedure 100a also includes a second protocol 130 (FIG. 1), wherein second protocol 130 is thereafter configured to randomly select a notary group from the plurality or groups, wherein the notary group is configured to use fourth protocol 120a. The notary group produces an output which is subsequently used by second protocol 130 to randomly select a second notary group from the plurality of groups.

In some embodiments, the creation protocol is configured to be run by each dealer node of the selected group. In some embodiments, the reading protocol is configured to be run by each receiver node of the selected group.

A single dealing message contains information about a single dealer node. Such information includes a key share from the single dealer node. When the creation protocol is run, the key share of a secret key which belongs to the single dealer node is produced for a receiver node. A different key share of the secret key is produced for each receiver node. Next, each different key share is encrypted with a public key corresponding to its receiver node (each receiver node is associated with a different public key), thereby resulting in an encrypted key share which is different for all receiver nodes.

In various embodiments, the system architecture for distributed key generation procedure 100a includes a verification protocol 135a, wherein verification protocol 135a is configured to verify veracity of the corresponding dealing message, wherein verification protocol 135a is configured to be run by the receiver node. The receiver decrypts the encrypted key share from the dealer. Verification protocol 135a is configured to verify the decrypted key share from the dealer node relative to a verification vector, wherein the information in the corresponding dealing message includes the encrypted key share from the dealer node and the verification vector. The verification vector belongs to the dealer node.

The system architecture for distributed key generation procedure 100a additionally includes a complaint protocol 140a, wherein complaint protocol 140a is configured to generate a complaint message, wherein the complaint message is signed by the receiver node, and wherein complaint protocol 140a is configured to be run by the receiver node. In some embodiments, the complaint message includes data regarding a lack of verification of the encrypted key share relative to the verification vector. In some embodiments, the data is a proof regarding the lack of verification of the encrypted key share relative to the verification vector.

In at least one embodiment, fifth protocol 115a is thereafter configured to broadcast the complaint message to the network. The system architecture for distributed key generation procedure 100a further includes a justification protocol 145a, wherein justification protocol 145a is configured to create a justification message, wherein the justification message includes justifications to the complaint message, wherein the dealer node is configured to run the justification protocol to create the justification message. In at least one embodiment, fifth protocol 115a is thereafter configured to broadcast the justification message to the network. In one or more embodiments, verification protocol 135a is configured to verify veracity of the justification message relative to the verification vector, wherein verification protocol 135a is configured to be run by a verifying node. In some embodiments, verification protocol 135a rejects veracity of the justification message. In some embodiments, verification protocol 135a accepts veracity of the justification message.

In various embodiments, the creation protocol is configured to create a plurality of second dealing messages, wherein each second dealing message of the plurality of second dealing messages includes information about each dealer node in a second selected group of the plurality of groups.

Furthermore, the system architecture for distributed key generation procedure 100a includes a registration protocol 150a, wherein registration protocol 150a is configured to consolidate a plurality of dealing messages of the selected group, wherein registration protocol 150a is run by the each receiver node. In one or more embodiments, the registration protocol is configured to consolidate confirmation of a plurality of justified public keys, wherein each justified public key of the plurality of justified public keys corresponds to the each dealing message. In some embodiments, the verification protocol has accepted veracity of each justified public key of the plurality of justified public keys.

In one or more embodiments, registration protocol 150a is run by the each verifying node. In one or more embodiments, the registration protocol is configured to consolidate confirmation of a plurality of dealing messages. In some embodiments, the verification protocol has accepted veracity of each dealing message. In some embodiments, the verification protocol has accepted veracity of each justification message associated with each dealing message. In some embodiments, each dealing message of the plurality of dealing message is not associated with any complains.

After the registration protocol has consolidated confirmation of the plurality of dealing messages, the each verifying node aggregates a plurality of public keys, where each public key is extracted from a dealing message of the consolidated (or confirmed) plurality of dealing messages. After the registration protocol has consolidated confirmation of the plurality of dealing messages, each receiver node aggregates a plurality of key shares, where each key share corresponds to a consolidated (or confirmed) dealing message.

In some embodiments, second protocol 130 thereafter commences, wherein second protocol 130 is configured to randomly select the first group from the plurality or groups formed by the first protocol. In at least one embodiment, the first group includes the selected group.

Example 1

A dealing message information about a dealer node. Such information includes a key share from the dealer node. When the dealing message is distributed to a receiver node, the dealer node encrypts the key shares with a public key of the receiver node. The dealing message, which includes an encrypted key share is received by the receiver node. The receiver node then verifies the encrypted key share from the dealer node relative to a verification vector of the dealer node. In the event there are multiple dealer nodes, the receiver node then consolidates multiple dealing messages. In some embodiments, the receiver node consolidates confirmation of a plurality of justified public keys, wherein each dealing message corresponds to a justified public key. The dealer node(s) is/are then considered as being honest.

Example 2

A dealing message information about a dealer node. Such information includes a key share from the dealer node. When the dealing message is distributed to a receiver node, the dealer node encrypts the key share with a public key of the receiver node. The dealing message, which includes an encrypted key share is received by the receiver node. The receiver decrypts the encrypted key share from the dealer. The receiver node then verifies the decrypted key share from the dealer node relative to a verification vector of the dealer node. The receiver node then complains by broadcasting a complaint message to the network. The complaint message includes data regarding a lack of verification of the encrypted key share relative to the verification vector. In some embodiments, the data is a proof regarding the lack of verification of the encrypted key share relative to the verification vector. The dealer node then broadcasts to the network a justification message. The dealer node publishes the justification message (which includes the key share) onto the network. A verification node then verifies veracity of the justification message (i.e. the key share) relative to the verification vector. In the event the verification node rejects the veracity of the justification message, then the protocol proceeds with registration with the understanding that the dealer node corresponding to the rejected justification message is dishonest. In the event that the verification node accepts the veracity, then the protocol proceeds with registration with the understanding that the dealer node with justified message is honest.

Figure 1B:
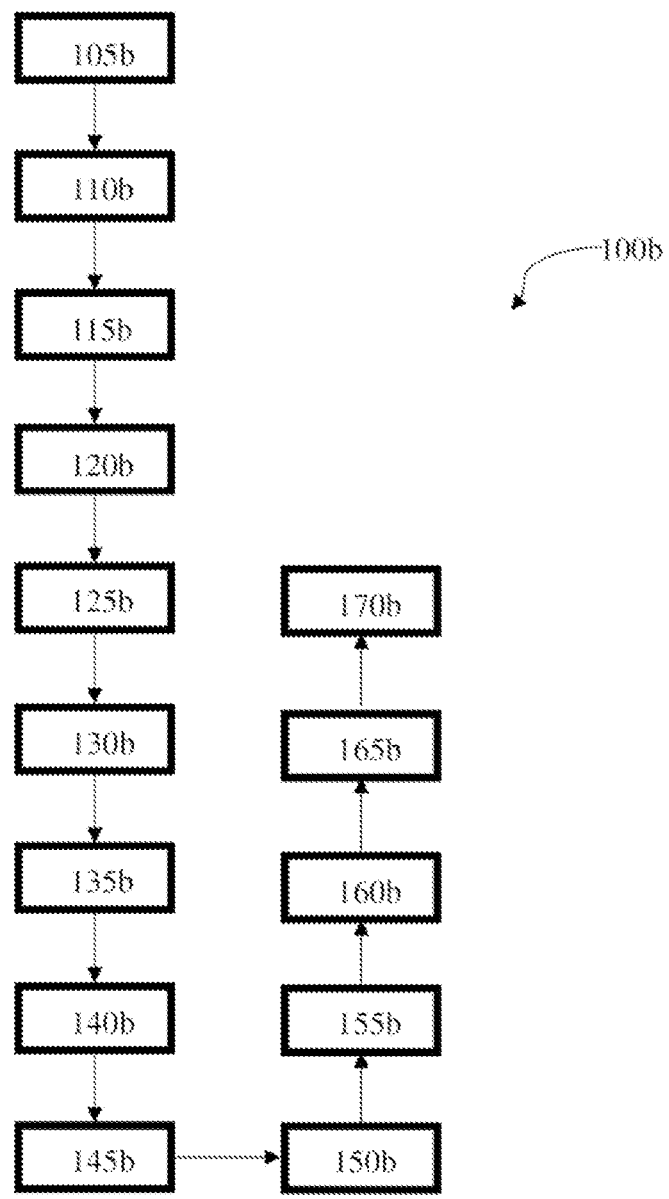
FIG. 1b is a flow-chart which illustrates a method 100b of processing data in a system architecture for distributed key generation procedure according to one or more embodiments.

FIG. 1b is a flow-chart which illustrates a method 100b of processing data in a system architecture for distributed key generation procedure according to one or more embodiments. A non-transitory computer-readable medium encoded with a computer-readable program which, when executed by a processor, will cause a computer to execute method 100b. In one or more embodiments, method 100b is executed after first protocol 120 (FIG. 1) forms the plurality of groups.

As previously indicated, each group of the plurality of groups includes the set of randomly selected nodes from the network. Method 100b starts off with step 105b where a creation protocol creates a plurality of dealing messages. Method 100b then continues with step 110b where a hash function generates a hash value from the each dealing message of the plurality of dealing messages. Method 100b then includes step 115b where a fifth protocol broadcasts a plurality of blocks to a network.

Further, method 100b includes step 120b where a fourth protocol notarizes the each block of the plurality of blocks. In various embodiments, a notary group notarizes the each block. In at least one embodiment, a second protocol randomly selects the notary group from the plurality of groups. Method 100b, additionally, includes step 125b where a reading protocol reads the dealing message to a receiver node of the selected group.

In one or more embodiments, each dealing message of the plurality of dealing messages includes information from each dealer node in a selected group of the plurality or groups. In some embodiments, each block of the plurality of blocks includes a dealing message of the plurality of dealing messages. In some embodiments, each block of the plurality of blocks includes at least two dealing messages of the plurality of dealing messages. In at least one embodiment, the receiver node is different from a dealer node whose information is contained in the corresponding dealing message. In some embodiments, the hash value is a root of a Merkle tree of the plurality of dealing messages. In at least one embodiment, the hash value is incorporated in a block of the plurality of blocks. In various embodiments, a single dealing message contains information about a single node. In various embodiments, the each dealing message of the plurality of dealing messages includes an encrypted key share from the dealer node.

Moreover, method 100b includes step 130b where a verification protocol verifies veracity of the corresponding dealing message. The receiver node runs the verification protocol. The verification protocol verifies the encrypted key share from the dealer node relative to a verification vector of the dealer node. The information in the corresponding dealing message includes the encrypted key share from the dealer node and the verification vector.

Method 100b continues with step 135b where a complaint protocol generates a complaint message. The complaint message is run by the receiver node, and the complaint message is signed by the receiver node. In one or more embodiments, the complaint message includes data regarding a lack of verification of the encrypted key share relative to the verification vector.

Method 100b continues with step 140b where the fifth protocol broadcasts the complaint message to the network. Method 100b further includes step 145b where a justification protocol creates a justification message. The dealer node runs the justification protocol to create the justification message, and the justification messages includes justifications to the complaint message.

Method 100b additionally includes step 150b where the fifth protocol broadcasts the justification message to the network. Furthermore, method 100b includes step 155b where a verifying node runs the verification protocol to verify veracity of the justification message relative to the verification vector. In some embodiments, the verification protocol rejects veracity of the justification message. In some embodiments, the verification protocol accepts veracity of the justification message.

In the event the verification protocol rejects veracity of the justification message, the creation protocol then creates a plurality of second dealing messages. In some embodiments, the verification protocol would need to reject a certain ratio of the justification messages in order for the creation protocol to create the plurality of second dealing messages. Each second dealing message of the plurality of second dealing messages includes information about each node in a second selected group of the plurality of groups.

In the event the verification protocol accepts veracity of the justification message, method 100b continues with step 160b where a registration protocol consolidates a plurality of dealing messages of the selected group. In some embodiments, the registration protocol is run by the each receiver node. In some embodiments, the registration protocol is run by the verifying node. In at least one embodiment, the registration protocol consolidates confirmation of a plurality of justified public keys. The each justified public key of the plurality of justified public keys corresponds to the each dealing message. In some embodiments, the verification protocol has accepted veracity of each justified public key of the plurality of justified public keys. In some embodiments, method 100b continues with step 160b directly after step 130b. Further, method 100b includes step 165b where the fifth protocol is configured to broadcast a consolidated confirmation to the network.

Method 100b continues with step 170b where the second protocol selects a first group from the plurality of groups formed by the first protocol. In some embodiments, the first group is randomly selected. In at least one embodiment, the first group includes the selected group.

One of ordinary skill in the art would recognize that operations are added or removed from method 100b, in one or more embodiments. One of ordinary skill in the art would also recognize that the order of the operations in method 100b is varied in various alternative embodiments.

Figure 2:
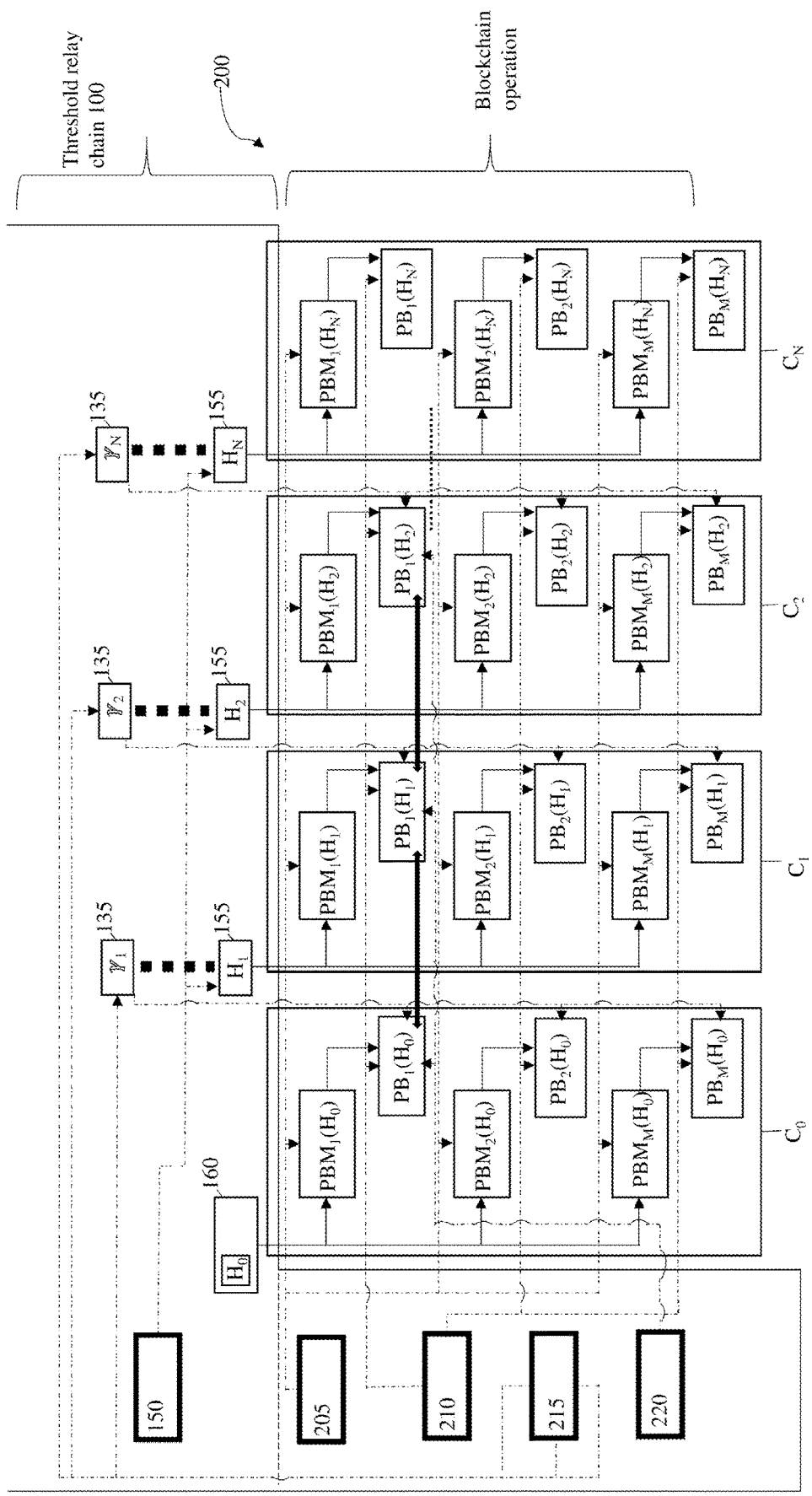
FIG. 2 illustrates a system architecture of a plurality of protocols of the threshold relay chain which are configured to operate a blockchain according to one or more embodiments.
Figure 5:
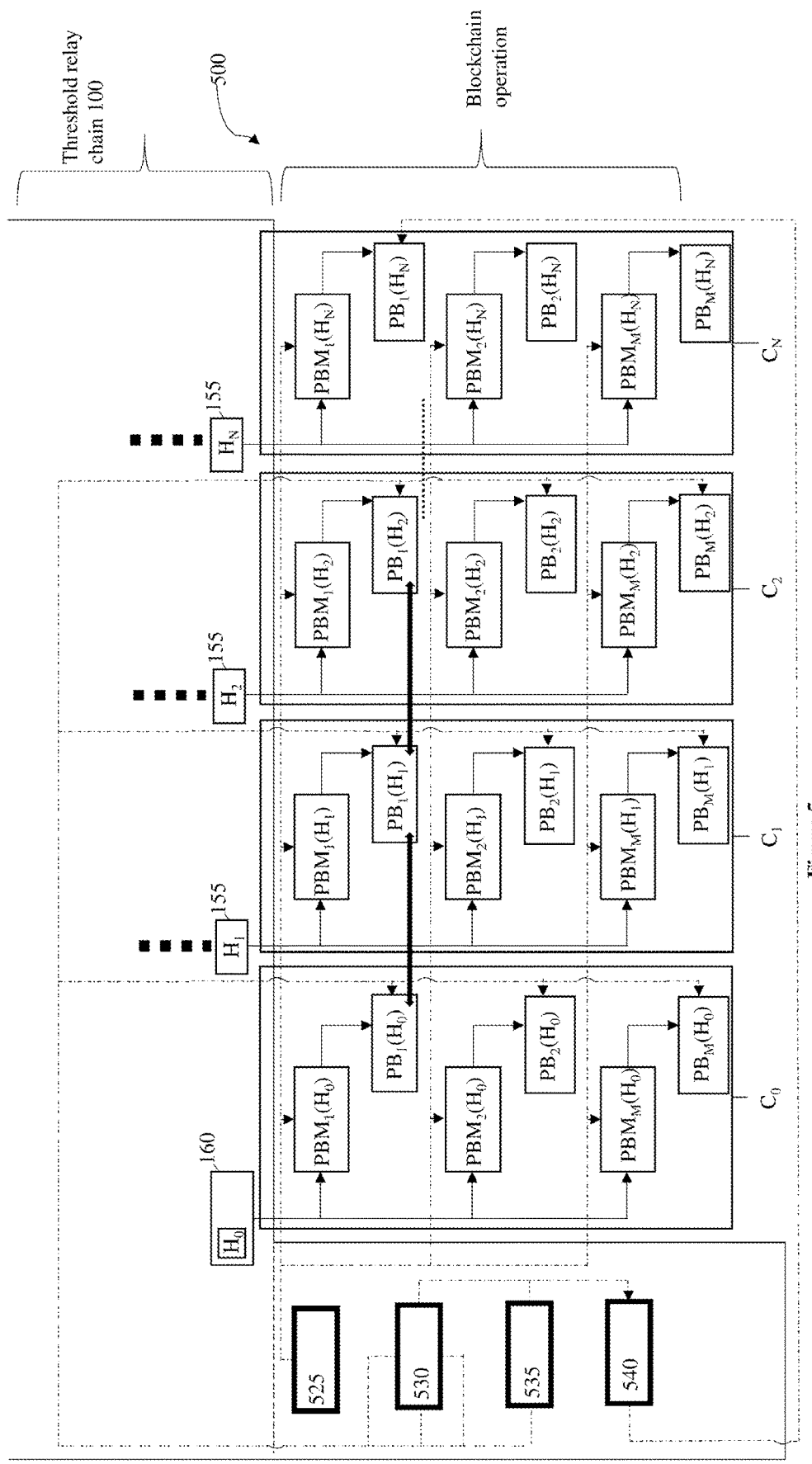
FIG. 5 illustrates a system architecture of a ranking system of the threshold relay chain according to one or more embodiments.

FIG. 2 illustrates a system architecture of a plurality of protocols of threshold relay chain 100 which are configured to operate a blockchain according to one or more embodiments. Referring back to FIG. 1, each of the hash value ((160, $H_0$); (155, $H_1$); (155, $H_2$) . . . (155, $H_N$)) is configured to select a plurality of block makers, which are illustrated in FIG. 2. A twelfth protocol 205 is configured to prioritize each block maker of the plurality of block makers based on a ranking system. A hierarchy of priority of each block maker which is precipitated from each of the hash value is illustrated in FIG. 2. FIG. 5 illustrates additional material on the ranking system.

For example: a highest prioritized block maker precipitating from hash value (160, $H_0$) is denoted by "$PBM_1(H_0)$." As numbers ascend, a priority level of a corresponding block maker which is precipitating from hash value (160, $H_0$) decreases. Hence, a block maker denoted by "$PBM_2(H_0)$" will have a priority level lower than a priority level of "$PBM_1(H_0)$." Additionally, a block maker denoted by "$PBM_M(H_0)$" will have a priority level lower than a priority level of "$PBM_1(H_0)$" and "$PBM_2(H_0)$", where M is a whole number greater than 2.

In another aspect, a highest prioritized block maker precipitating from hash value (155, $H_1$) is denoted by "$PBM_1(H_1)$." As numbers ascend, a priority level of a corresponding block maker which is precipitating from hash value (155, $H_1$) decreases. Hence, a block maker denoted by "$PBM_2(H_1)$" will have a priority level lower than a priority level of "$PBM_1(H_1)$." Additionally, a block maker denoted by "$PBM_M(H_1)$" will have a priority level lower than a priority level of "$PBM_1(H_1)$" and "$PBM_2(H_1)$", where M is a whole number greater than 2.

Still in another aspect, a highest prioritized block maker precipitating from hash value (155, $H_2$) is denoted by "$PBM_1(H_2)$." As numbers ascend, a priority level of a corresponding block maker which is precipitating from hash value (155, $H_2$) decreases. Hence, a block maker denoted by "$PBM_2(H_2)$" will have a priority level lower than a priority level of "$PBM_1(H_2)$." Additionally, a block maker denoted by "$PBM_M(H_2)$" will have a priority level lower than a priority level of "$PBM_1(H_2)$" and "$PBM_2(H_2)$", where M is a whole number greater than 2.

Furthermore, a highest prioritized block maker precipitating from hash value (155, $H_N$) is denoted by "$PBM_1(H_N)$." As numbers ascend, a priority level of a corresponding block maker which is precipitating from hash value (155, $H_N$) decreases. Hence, a block maker denoted by "$PBM_2(H_N)$" will have a priority level lower than a priority level of "$PBM_1(H_N)$." Additionally, a block maker denoted by "$PBM_M(H_N)$" will have a priority level lower than a priority level of "$PBM_1(H_N)$" and "$PBM_2(H_N)$", where M is a whole number greater than 2; and N is a whole number greater than 2.

Referring back to FIG. 2, each block makers of the plurality of block makers is configured to create a block. The block includes transactions collected by a block maker of the plurality of block makers. Discussion regarding FIG. 2 will continue after the discussion below of FIG. 3.

Figure 3:
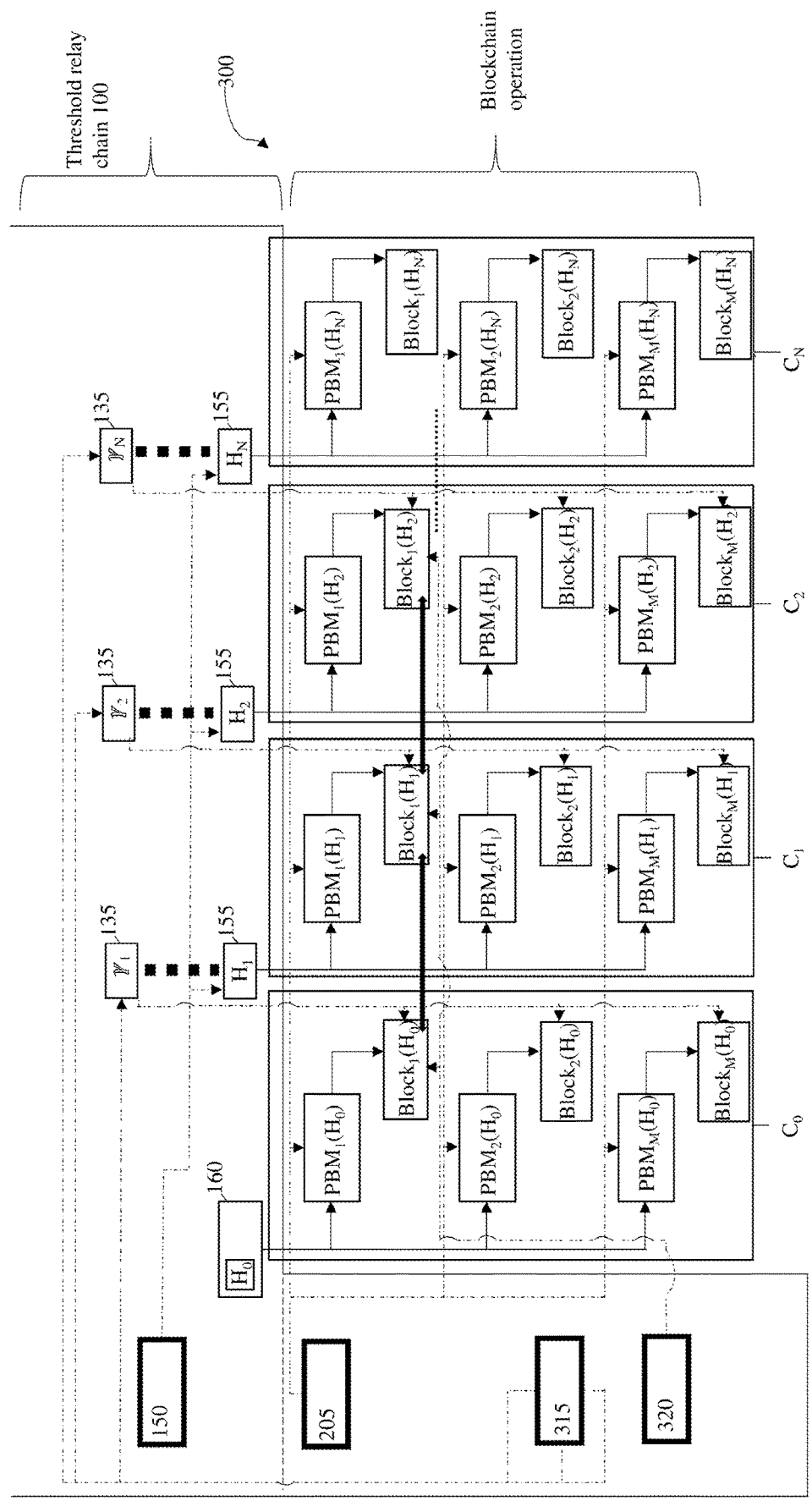
FIG. 3 illustrates a system architecture of a plurality of protocols of the threshold relay chain which are configured to validate and timestamp a block of a plurality of blocks according to one or more embodiments.

FIG. 3 illustrates a system architecture of a plurality of protocols of threshold relay chain 100 which are configured to validate and timestamp a block of a plurality of blocks according to one or more embodiments. In at least one embodiment, a fourth protocol 315 is configured to designate N-th group (135, $\gamma_N$) to validate a block of a plurality of blocks within the preceding cycle from N-th group (135, $\gamma_N$) (for example: $C_{N-1}$) by generating a N-th secondary group signature. The N-th secondary group signature authenticates the block. In at least one embodiment, fourth protocol 315 is configured to perform the above functions contemporaneously. In various embodiments, validation of any block includes at least one of checking signatures, checking references, verifying hashes, verifying transactions, checking size, checking execution time, or checking double-spends. In at least one embodiment, fourth protocol 315 is configured to validate blocks, thereby notarizing said validated blocks.

Staying on FIG. 3, fourth protocol 315 is configured to designate first group (135, $\gamma_1$) to validate and timestamp a block of the plurality of blocks by generating a first secondary group signature, wherein the plurality of blocks is within the preceding cycle (for example: $C_0$). The first secondary group signature authenticates the block. Additionally, fourth protocol 315 is configured to designate second group (135, $\gamma_2$) to timestamp a block of the plurality of blocks by generating a second secondary group signature, wherein the plurality of blocks is within the preceding cycle (for example: $C_1$). The second secondary group signature authenticates the block. Furthermore, fourth protocol 315 is configured to designate N-th group (135, $\gamma_N$) to timestamp block of the plurality of blocks by generating the N-th secondary group signature, wherein the plurality of blocks is within the preceding cycle (for example: $C_{N-1}$). The N-th secondary group signature authenticates the block. In at least one embodiment, fourth protocol 315 is configured to perform the above functions contemporaneously. In various embodiments, the timestamping is based on a signature scheme, wherein the signature scheme includes at least one of bilinear pairings, bilinear pairings on elliptic curves, threshold scheme, Gap Diffie-Hellman groups (GDH) or Boneh-Lynn-Shacham (BLS) scheme. In one or more embodiments, fourth protocol 315 is configured to timestamp blocks that are validated. In one or more embodiments, fourth protocol 315 is configured to only timestamp blocks that are validated, thereby notarizing said timestamped and validated blocks. In various embodiments, timestamps are only issued in a certain time window.

In some embodiments, the notarized block is configured to be generated by a threshold set of first group (135, $\gamma_1$), wherein a size of the threshold set is smaller than or equal to a size of first group (135, $\gamma_1$). In some embodiments, the notarized block is configured to be generated by a threshold set of second group (135, $\gamma_2$), wherein a size of the threshold set is smaller than or equal to a size of second group (135, $\gamma_2$). In some embodiments, the notarized block is configured to be generated by a threshold set of N-th group (135, $\gamma_N$), wherein a size of the threshold set is smaller than or equal to a size of N-th group (135, $\gamma_N$).

The first group signature is configured to be generated by a threshold set of the first group (135, $\gamma_1$), wherein a size of the threshold set is smaller than or equal to a size of the first group. In at least one embodiment, the size of the threshold set of first group (135, $\gamma_1$) is a system parameter. The second group signature is configured to be generated by a threshold set of the second group (135, $\gamma_2$), wherein a size of the threshold set is smaller than or equal to a size of the second group. In at least one embodiment, the threshold set of second group (135, $\gamma_2$) is a system parameter. The N-th group signature is configured to be generated by a threshold set of the N-th group (135, $\gamma_N$), wherein a size of the threshold set is smaller than or equal to a size of the N-th group. In at least one embodiment, the threshold set of N-th group (135, $\gamma_N$) is a system parameter.

The system architecture of the plurality of protocols of threshold relay chain 100 which are configured to validate and timestamp the block of the plurality of blocks further include a fifth protocol 320, wherein fifth protocol 320 is configured to broadcast at least one of the first secondary group signature or a timestamped block within cycle $C_0$ to the network. The first secondary group signature is configured to timestamp the respective block. Additionally, fifth protocol 320 is configured to broadcast at least one of the second secondary group signature or a timestamped block within cycle $C_1$ to the network. The second secondary group signature is configured to timestamp the respective block. Furthermore, fifth protocol 320 is configured to broadcast at least one of the N-th secondary group signature or a timestamped block within cycle $C_{N-1}$ to the network. The N-th secondary group signature is configured to timestamp the respective block. In at least one embodiment, fifth protocol 320 is configured to perform the above functions contemporaneously. Any timestamped block which is broadcasted references another timestamped block of a different cycle.

Any notarized block within its respective cycle which is broadcasted references another block of a different cycle. In at least one embodiment, the another block is notarized.

Referring back to FIG. 2, the system architecture of the plurality of protocols of threshold relay chain 100 which are configured to operate a blockchain further includes a thirteenth protocol 210, wherein thirteenth protocol 210 is configured to prioritize each block among a plurality of blocks available for timestamping. Additionally, thirteenth protocol 210 is configured to prioritize each block among the plurality of blocks based on the ranking system of the plurality of block makers.

In one or more embodiments, thirteenth protocol 210 is configured to prioritize the each block among the plurality of blocks by using a hash value within the respective cycle. For example: thirteenth protocol 210 is configured to prioritize the each block among the plurality of blocks within $C_0$ by using hash value (160, $H_0$). In some embodiments, thirteenth protocol 210 is configured to prioritize the each block among the plurality of blocks within $C_1$ by using hash value (155, $H_1$). In some embodiments, thirteenth protocol 210 is configured to prioritize the each block among the plurality of blocks within $C_2$ by using hash value (155, $H_2$). In some embodiments, thirteenth protocol 210 is configured to prioritize the each block among the plurality of blocks within $C_N$ by using hash value (155, $H_N$) and/or (160, $H_0$). A hierarchy of priority of each block which is precipitated from each of the hash value is also illustrated in FIG. 2.

For example: a highest prioritized block precipitating from hash value (160, $H_0$) is denoted by "$PB_1(H_0)$." As numbers ascend, a priority level of a corresponding block which is precipitating from hash value (160, $H_0$) decreases. Hence, a block denoted by "$PB_2(H_0)$" will have a priority level lower than a priority level of "$PB_1(H_0)$." Additionally, a block denoted by "$PB_M(H_0)$" will have a priority level lower than a priority level of "$PB_1(H_0)$" and "$PB_2(H_0)$", where M is a whole number greater than 2.

In another aspect, a highest prioritized block precipitating from hash value (155, $H_1$) is denoted by "$PB_1(H_1)$." As numbers ascend, a priority level of a corresponding block which is precipitating from hash value (155, $H_1$) decreases. Hence, a block denoted by "$PB_2(H_1)$" will have a priority level lower than a priority level of "$PB_1(H_1)$." Additionally, a block denoted by "$PB_M(H_1)$" will have a priority level lower than a priority level of "$PB_1(H_1)$" and "$PB_2(H_1)$", where M is a whole number greater than 2.

Still in another aspect, a highest prioritized block precipitating from hash value (155, $H_2$) is denoted by "$PB_1(H_2)$." As numbers ascend, a priority level of a corresponding block which is precipitating from hash value (155, $H_2$) decreases. Hence, a block denoted by "$PB_2(H_2)$" will have a priority level lower than a priority level of "$PB_1(H_2)$." Additionally, a block denoted by "$PB_M(H_2)$" will have a priority level lower than a priority level of "$PB_1(H_2)$" and "$PB_2(H_2)$", where M is a whole number greater than 2.

Furthermore, a highest prioritized block precipitating from hash value (155, $H_N$) is denoted by "$PB_1(H_N)$." As numbers ascend, a priority level of a corresponding block which is precipitating from hash value (155, $H_N$) decreases. Hence, a block denoted by "$PB_2(H_N)$" will have a priority level lower than a priority level of "$PB_1(H_N)$." Additionally, a block denoted by "$PB_M(H_N)$" will have a priority level lower than a priority level of "$PB_1(H_N)$" and "$PB_2(H_N)$", where M is a whole number greater than 2; and N is a whole number greater than 2.

The system architecture of the plurality of protocols of threshold relay chain 100 which are configured to operate a blockchain further includes a fourth protocol 215, wherein fourth protocol 215 is configured to designate first group (135, $\gamma_1$) to validate a block of a plurality of blocks within the preceding cycle from first group (135, $\gamma_1$) (for example: $C_0$) by generating a first secondary group signature, according to at least one embodiment. The first secondary group signature authenticates the block. Additionally, fourth protocol 215 is configured to designate second group (135, $\gamma_2$) to validate a block of a plurality of blocks within the preceding cycle from second group (135, $\gamma_2$) (for example: $C_1$) by generating a second secondary group signature, according to at least one embodiment. The second secondary group signature authenticates the block. Furthermore, fourth protocol 215 is configured to designate N-th group (135, $\gamma_N$) to validate a block of a plurality of blocks within the preceding cycle from N-th group (135, $\gamma_N$) (for example: $C_{N-1}$) by generating the N-th secondary group signature, according to at least one embodiment. The N-th secondary group signature authenticates the block. In at least one embodiment, fourth protocol 215 is configured to perform the above functions contemporaneously. In various embodiments, validation of any block includes at least one of checking signatures, checking references, verifying hashes, verifying transactions, checking size, checking execution time, or checking double-spends. In at least one embodiment, fourth protocol 215 is configured to validate blocks, thereby notarizing said validated blocks.

Staying on FIG. 2, the system architecture of the plurality of protocols of threshold relay chain 100 which are configured to operate the blockchain include fourth protocol 215, wherein fourth protocol 215 is configured to designate first group (135, $\gamma_1$) to timestamp a first prioritized block of the plurality of blocks by generating the first secondary group signature, wherein the plurality of blocks is within the preceding cycle (for example: $C_0$). The first secondary group signature authenticates the first prioritized block. Additionally, fourth protocol 215 is configured to designate second group (135, $\gamma_2$) to timestamp a second prioritized block of the plurality of blocks by generating the second secondary group signature, wherein the plurality of blocks is within the preceding cycle (for example: $C_1$). The second secondary group signature authenticates the second prioritized block. Furthermore, fourth protocol 215 is configured to designate N-th group (135, $\gamma_N$) to timestamp an (N-1)-th prioritized block of the plurality of blocks by generating the N-th secondary group signature, wherein the plurality of blocks is within the preceding cycle (for example: $C_{N-1}$). The N-th secondary group signature authenticates the (N-1)-th prioritized block. In at least one embodiment, fourth protocol 215 is configured to perform the above functions contemporaneously. In various embodiments, the timestamping is based on a signature scheme, wherein the signature scheme includes at least one of bilinear pairings, bilinear pairings on elliptic curves, threshold scheme, Gap Diffie-Hellman groups (GDH) or Boneh-Lynn-Shacham (BLS) scheme. In one or more embodiments, fourth protocol 215 is configured to only timestamp blocks that are validated, thereby notarizing said timestamped and validated blocks. In various embodiments, timestamps are only issued in a certain time window.

In some embodiments, the notarized block is configured to be generated by a threshold set of first group (135, $\gamma_1$), wherein a size of the threshold set is smaller than or equal to a size of first group (135, $\gamma_1$). In some embodiments, the notarized block is configured to be generated by a threshold set of second group (135, $\gamma_2$), wherein a size of the threshold set is smaller than or equal to a size of second group (135, $\gamma_2$). In some embodiments, the notarized block is configured to be generated by a threshold set of N-th group (135, $\gamma_N$), wherein a size of the threshold set is smaller than or equal to a size of N-th group (135, $\gamma_N$).

The system architecture of the plurality of protocols of threshold relay chain 100 which are configured to operate the blockchain further include a fifth protocol 220, wherein fifth protocol 220 is configured to broadcast the first secondary group signature or a notarized first block. The first secondary group signature is configured to notarize the first block. Additionally, fifth protocol 220 is configured to broadcast the second secondary group signature or a notarized second block. The second secondary group signature is configured to notarize the second block. Furthermore, fifth protocol 220 is configured to broadcast the N-th secondary group signature or a notarized N-th block. The N-th secondary group signature is configured to notarize the N-th block. In at least one embodiment, fifth protocol 220 is configured to perform the above functions contemporaneously.

Any notarized block within its respective cycle which is broadcasted references another block of a different cycle. In at least one embodiment, the another block is notarized.

Figure 4:
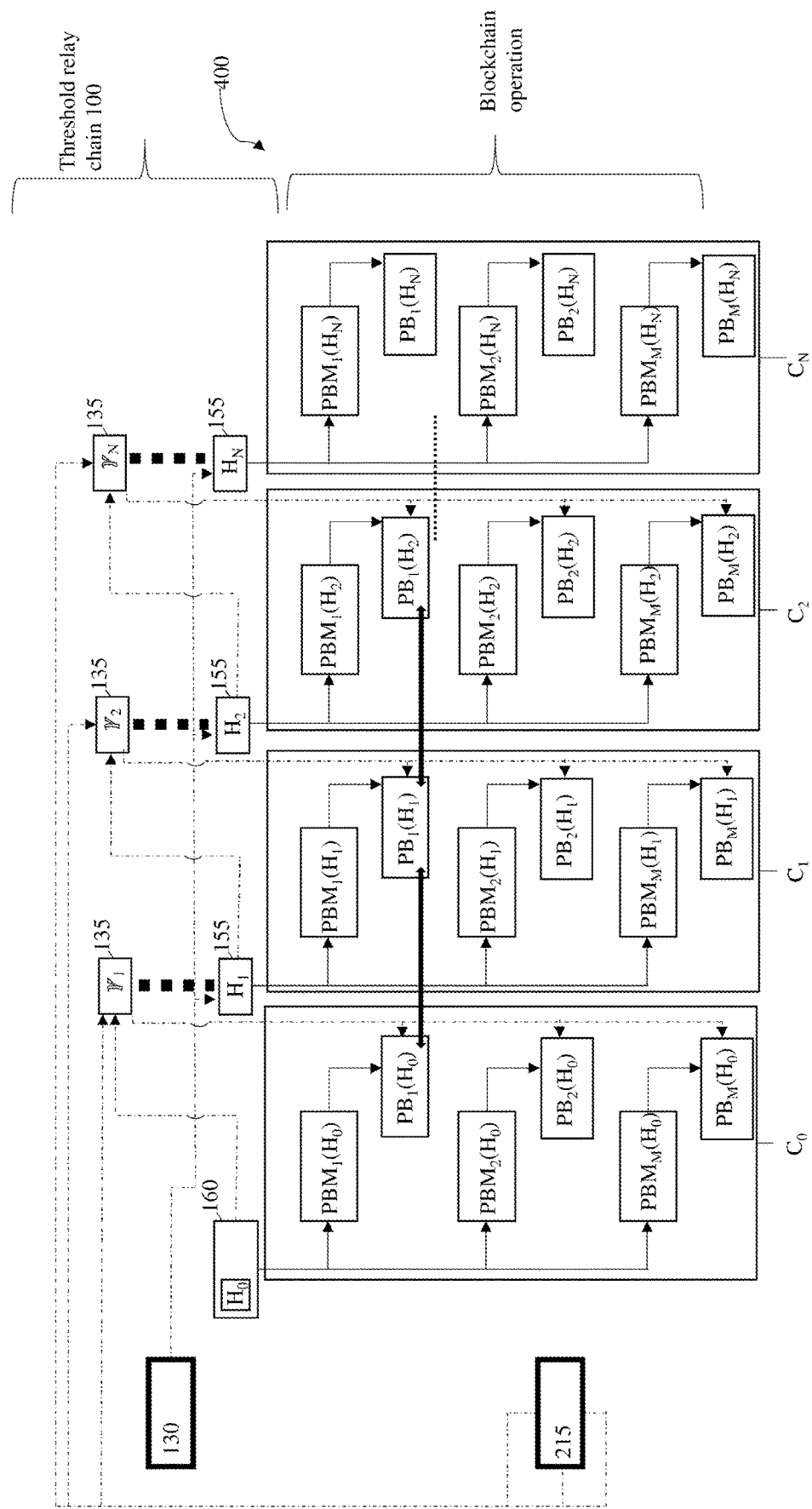
FIG. 4 illustrates a system architecture of a plurality of protocols of the threshold relay chain which are configured to sustain a systematic randomness-based block validation according to one or more embodiments.

FIG. 4 illustrates a system architecture of a plurality of protocols of the threshold relay chain 100 which are configured to sustain a systematic randomness-based block validation according to one or more embodiments. As previously discussed, each of the hash value ((160, $H_0$); (155, $H_1$); (155, $H_2$) . . . (155, $H_N$)) is configured to select a plurality of block makers. Second protocol 130 along hash value (160, $H_0$) are configured to select first group (135, $\gamma_1$). In one or more embodiments, fourth protocol 215 is configured to designate first group (135, $\gamma_1$) to timestamp a block of the plurality of blocks, wherein the plurality of blocks is within the preceding cycle (for example: $C_0$). Only after fourth protocol 215 validates the timestamp does first group (135, $\gamma_1$) use the first group signature to sign first message (145, $M_1$), and thereby continuing with threshold relay chain 100 operation as illustrated in FIG. 1.

Second protocol 130 along hash value (155, $H_1$) are configured to select second group (135, $\gamma_2$). In one or more embodiments, fourth protocol 215 is configured to designate second group (135, $\gamma_2$) to timestamp a block of the plurality of blocks, wherein the plurality of blocks is within the preceding cycle (for example: $C_1$). Only after fourth protocol 215 validates the timestamp does second group (135, $\gamma_2$) use the second group signature to sign second message (145, $M_2$), and thereby continuing with threshold relay chain 100 operation as illustrated in FIG. 1.

Second protocol 130 along hash value (155, $H_{N-1}$) are configured to select N-th group (135, $\gamma_N$). In one or more embodiments, fourth protocol 215 is configured to designate N-th group (135, $\gamma_N$) to timestamp a block of the plurality of blocks, wherein the plurality of blocks is within the preceding cycle (for example: $C_{N-1}$). Only after fourth protocol 215 validates the corresponding timestamp does N-th group (135, $\gamma_N$) use the N-th group signature to sign N-th message (145, $M_N$), and thereby continuing with threshold relay chain 100 operation as illustrated in FIG. 1.

FIG. 5 illustrates a system architecture of a ranking system 500 of threshold relay chain 100 according to one or more embodiments. In various embodiments, the system architecture of the ranking system of threshold relay chain 100 includes an eighth protocol 525, wherein eighth protocol 525 is configured to derive a rank for each block maker of the plurality of block makers. In some embodiments, the rank is derived from the first group signature for the preceding cycle (for example: $C_0$). In some embodiments, the rank is derived from the second group signature for the preceding cycle (for example: $C_1$). In some embodiments, the rank is derived from the N-th group signature for the preceding cycle (for example: $C_{N-1}$).

The system architecture of the ranking system of threshold relay chain 100 further includes a ninth protocol 530, wherein ninth protocol 530 is configured to assign a plurality of first weights, to each block associated with a respective block maker of the plurality of block makers. In some embodiments, a single first weight is assigned to the each block. In at least one embodiment, each first weight of the plurality of first weights of the each block is based on the rank of the respective block maker of the plurality of block makers.

The system architecture of the ranking system of threshold relay chain 100 further includes a tenth protocol 535, wherein tenth protocol 535 is configured to assign a second weight to at least one chain of blocks. In at least one embodiment, the second weight of the at least one chain of blocks is based on the each first weight of the each block in the at least one chain of blocks, wherein a block of the at least one chain of blocks references another block of the at least one chain of blocks.

The system architecture of the ranking system of threshold relay chain 100 further includes an eleventh protocol 540, wherein eleventh protocol 540 is configured to select a preceding block of a chain of blocks of the at least one chain of blocks based on a factor. In at least one embodiment, the factor comprises the first weight of the preceding block of the chain of blocks or the second weight of the chain of blocks.

Figure 6:
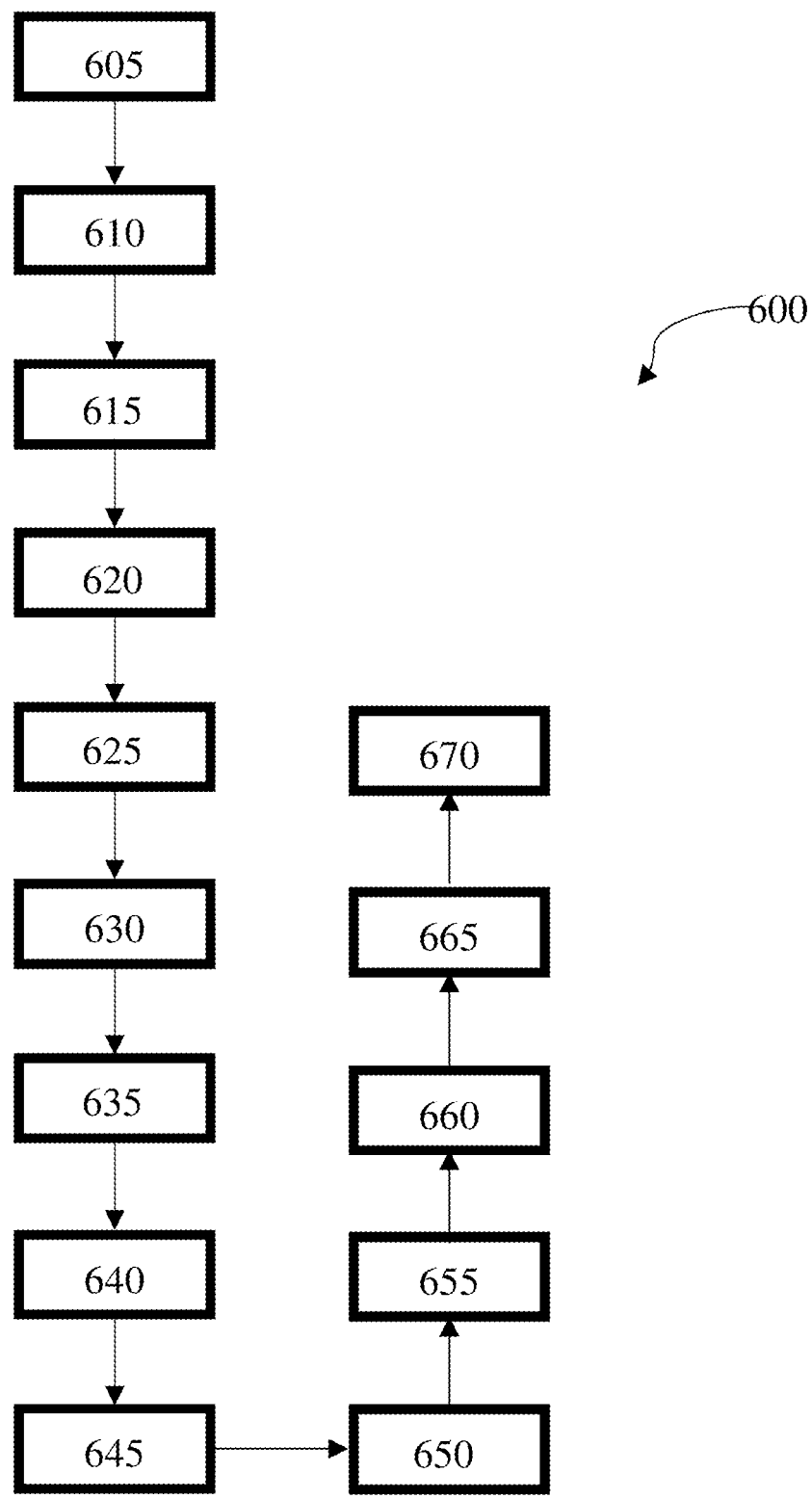
FIG. 6 is a flow-chart which illustrates a method of processing data in a system architecture according to one or more embodiments.

FIG. 6 is a flow-chart which illustrates a method 600 of processing data in a system architecture according to one or more embodiments. A non-transitory computer-readable medium encoded with a computer-readable program which, when executed by a processor, will cause a computer to execute method 600. Method 600 starts off with step 605 where a plurality of nodes is nominated by a sixth protocol. Method 600 continues with step 610 where a plurality of groups is formed by a first protocol. In at least one embodiment, each group of the plurality of groups includes a set of randomly selected nodes from a network. In some embodiments, the set of randomly selected nodes are part of the plurality of nodes.

Method 600 continues with step 615 where any potential misbehavior of a select node of the set of randomly selected nodes and/or the plurality of nodes is detected by a seventh protocol. In one or more embodiments, the select node is penalized and/or revoke a nomination. Method 600 continues with step 620 where a first group is randomly selected from the plurality of groups by a second protocol. In some embodiments, the first group is randomly selected by the second protocol based on a seed. In some embodiments, the first group is randomly selected by the second protocol based on a seed which is based on a preceding group signature.

Method 600 further continues with step 625 where a group public key for the first group is established by a setup protocol. In step 630, the first group signs a first message by generating a first group signature. In one or more embodiments, a third protocol is configured to designate the first group to sign the first message. Furthermore, method 600 continues with step 635 where a hash value is generated from the first group signature. In one or more embodiments, a hash function is configured to generate the hash value from the first group signature.

Method 600 continues with step 640 where the hash value along with the second protocol is configured to select a second group for a subsequent cycle. In one or more embodiments, the second group of the subsequent cycle continues with steps which are analogous to step 625 and onwards of method 600, only after a block of the plurality of blocks is at least one of validated or timestamped by a fourth protocol, as indicated in step 670 of the preceding cycle which is discussed below.

Referring back to the preceding cycle, method 600 continues with step 645 where a plurality of block makers is selected by the hash value. Additionally, method 600 includes step 650 where each block maker of the plurality of block makers is prioritized by a twelfth protocol. In at least one embodiment, the twelfth protocol is configured to prioritize the each block maker of the plurality of block makers based on a ranking system. In some embodiments, the ranking system includes ranking system 500 as illustrated in FIG. 5. Method 600 continues with step 655 where each block of the plurality of blocks within the preceding cycle are prioritized by a thirteenth protocol. Method 600 additionally continues with step 660 where a block of the plurality of blocks is timestamped by the fourth protocol. In at least one embodiment, the fourth protocol is configured to designate the second group to timestamp the block of the plurality of blocks in the preceding cycle. In some embodiments, fourth protocol only timestamps blocks that are prioritized. In some embodiments, fourth protocol timestamps blocks, irrespective as to whether they are prioritized. In some embodiments, the timestamp is created using a secondary group signature.

Furthermore, method 600 continues with step 665 where a block of the plurality of blocks is validated by the fourth protocol. In at least one embodiment, the fourth protocol is configured to designate the second group to validate the block of the plurality of blocks using the secondary group signature. In some embodiments, only prioritized block is validated. In some embodiments, the plurality of blocks is validated irrespective of their priority. In some embodiments, only validated block is timestamped. In some embodiments, only timestamped block is validated.

Method 600 further continues with step 670 where at least one of the secondary group signature or a timestamped block within the preceding cycle is broadcasted by a fifth protocol.

One of ordinary skill in the art would recognize that operations are added or removed from method 600, in one or more embodiments. One of ordinary skill in the art would also recognize that the order of the operations in method 600 is varied in various alternative embodiments.

Figure 7:
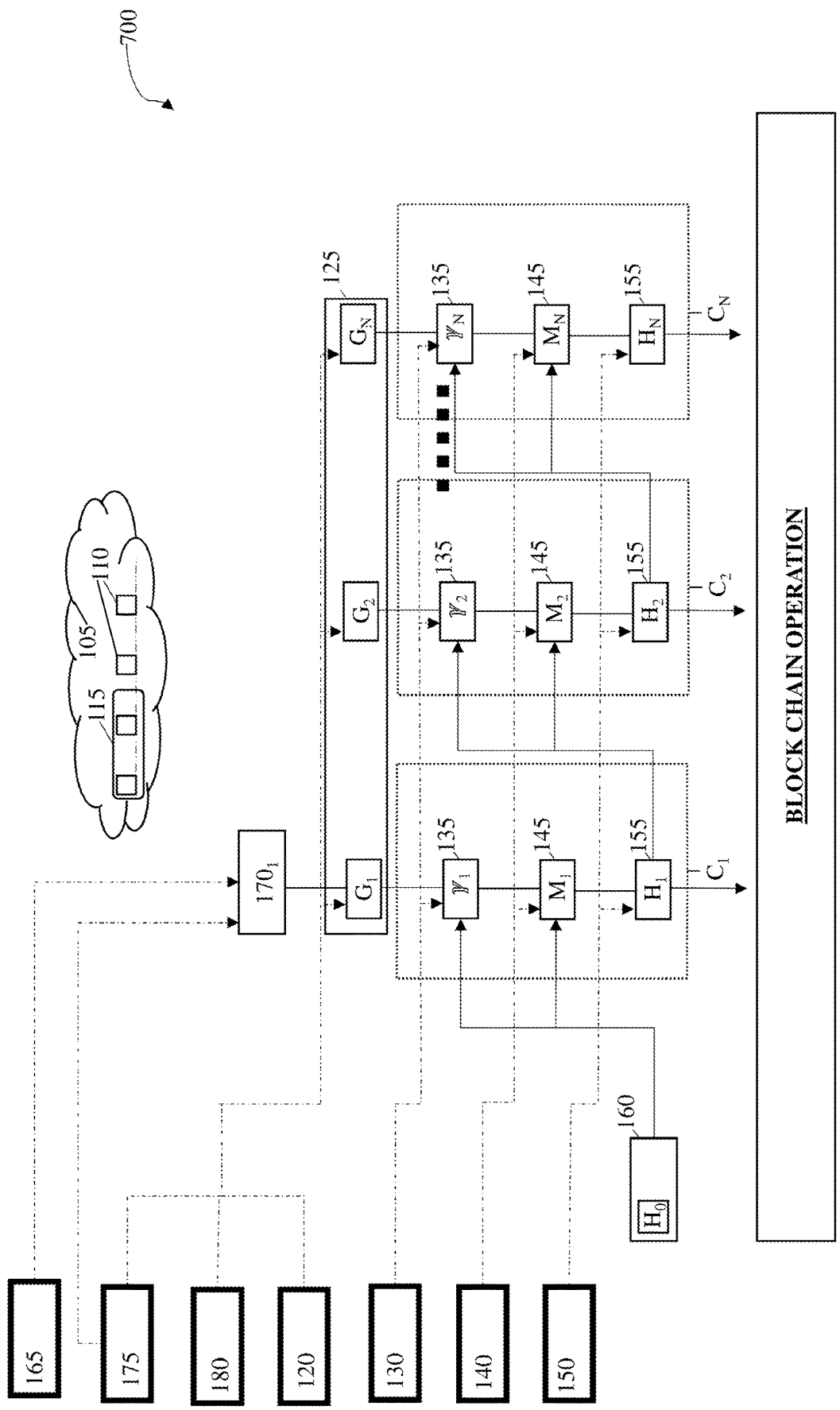
FIG. 7 illustrates a system architecture of a threshold relay chain according to one or more embodiments.

FIG. 7 illustrates a system architecture of a threshold relay chain 700 according to one or more embodiments. The system architecture of threshold relay chain 700 (FIG. 7) is similar to threshold relay chain 100 (FIG. 1). Similar elements in threshold relay chain 700 (FIG. 7) have a same reference number as in FIG. 1. In comparison with FIG. 1, FIG. 7 includes a hash value (160, $H_0$), wherein hash value (160, $H_0$) of FIG. 7 does not select a plurality of block makers.

As previously discussed, remaining features of the system architecture of the threshold relay chain 700 (FIG. 7) is similar to the system architecture of the threshold relay chain 100 (FIG. 1).

Figure 8:
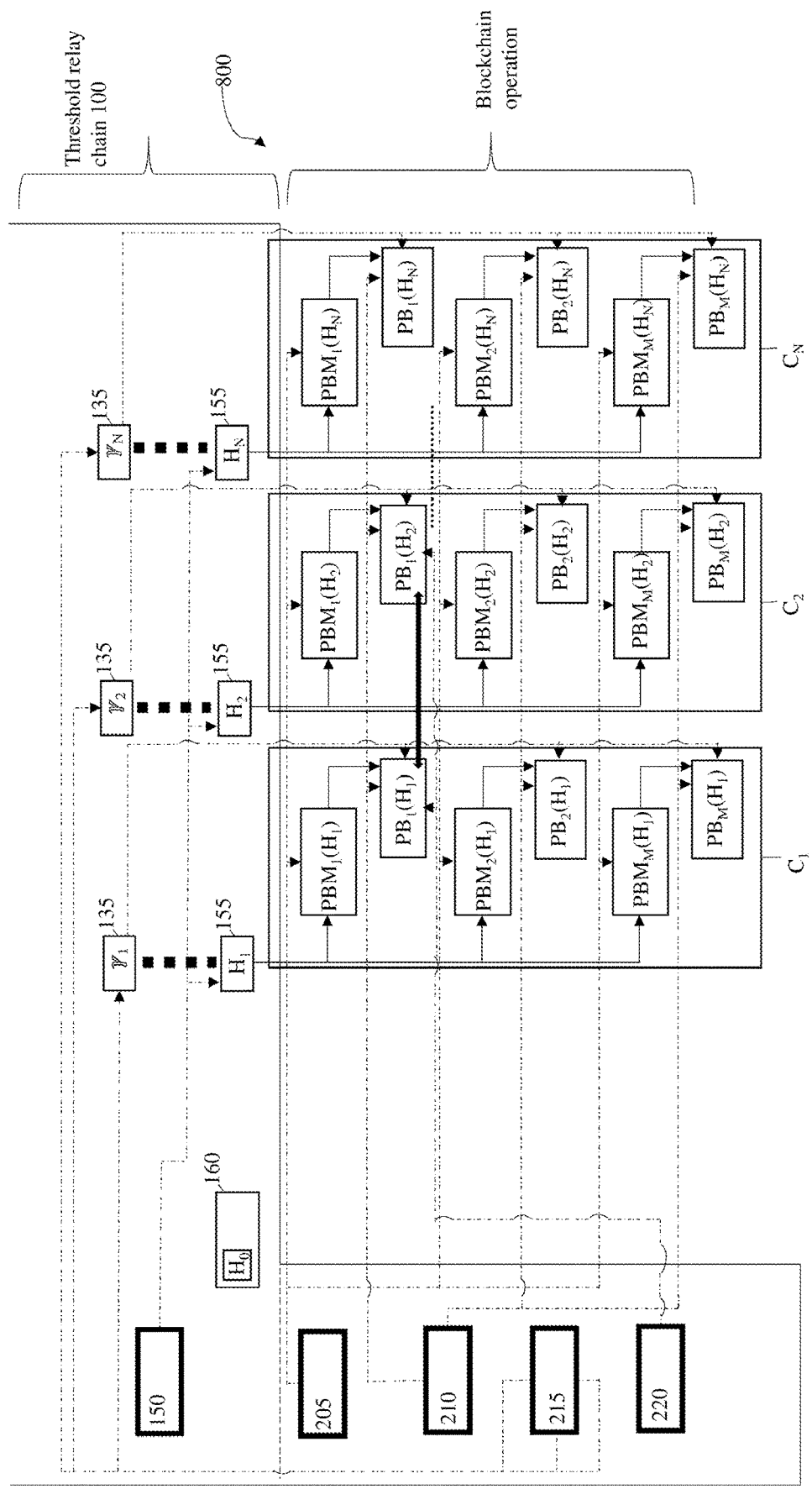
FIG. 8 illustrates a system architecture of a plurality of protocols of the threshold relay chain which are configured to operate a blockchain according to one or more embodiments.

FIG. 8 illustrates a system architecture of a plurality of protocols of threshold relay chain 700 which are configured to operate a blockchain according to one or more embodiments. The system architecture of the plurality of protocols of threshold relay chain 700 (FIG. 8) is similar to the system architecture of the plurality of protocols of threshold relay chain 100 (FIG. 2). Similar elements in the system architecture of the plurality of protocols of threshold relay chain 700 (FIG. 8) have a same reference number as in FIG. 2. In comparison with FIG. 2, FIG. 8 includes a hash value (160, $H_0$), wherein hash value (160, $H_0$) of FIG. 8 does not select a plurality of block makers.

In comparison with FIG. 2, the system architecture of the plurality of protocols of threshold relay chain 700 which are configured to operate a blockchain (FIG. 8) includes a fourth protocol 215, wherein fourth protocol 215 of FIG. 8 is configured to designate first group (135, $\gamma_1$) to validate a block of a plurality of blocks within a respective cycle (for example: $C_1$) by generating a first secondary group signature, according to at least one embodiment. The first secondary group signature authenticates the block. Additionally, fourth protocol 215 of FIG. 8 is configured to designate second group (135, $\gamma_2$) to validate a block of a plurality of blocks within a respective cycle (for example: $C_2$) by generating a second secondary group signature, according to at least one embodiment. The second secondary group signature authenticates the block. Furthermore, fourth protocol 215 of FIG. 8 is configured to designate N-th group (135, $\gamma_N$) to validate a block of a plurality of blocks within a respective cycle (for example: $C_N$) by generating the N-th secondary group signature, according to at least one embodiment. The N-th secondary group signature authenticates the block. In at least one embodiment, fourth protocol 215 of FIG. 8 is configured to perform the above functions contemporaneously. In various embodiments, validation of any block includes at least one of checking signatures, checking references, verifying hashes, verifying transactions, checking size, checking execution time, or checking double-spends. In at least one embodiment, fourth protocol 215 of FIG. 8 is configured to validate blocks, thereby notarizing said validated blocks.

In comparison with FIG. 2, the system architecture of the plurality of protocols of threshold relay chain 700 which are configured to operate the blockchain (FIG. 8) include fourth protocol 215, wherein fourth protocol 215 of FIG. 8 is configured to designate first group (135, $\gamma_1$) to timestamp a first prioritized block of the plurality of blocks by generating the first secondary group signature, wherein the plurality of blocks is within a respective cycle (for example: $C_1$). The first secondary group signature authenticates the first prioritized block. Additionally, fourth protocol 215 of FIG. 8 is configured to designate second group (135, $\gamma_2$) to timestamp a second prioritized block of the plurality of blocks by generating the second secondary group signature, wherein the plurality of blocks is within a respective cycle (for example: $C_2$). The second secondary group signature authenticates the second prioritized block. Furthermore, fourth protocol 215 of FIG. 8 is configured to designate N-th group (135, $\gamma_N$) to timestamp an N-th prioritized block of the plurality of blocks by generating the N-th secondary group signature, wherein the plurality of blocks is within a respective cycle (for example: $C_N$). The N-th secondary group signature authenticates the N-th prioritized block. In at least one embodiment, fourth protocol 215 of FIG. 8 is configured to perform the above functions contemporaneously. In various embodiments, the timestamping is based on a signature scheme, wherein the signature scheme includes at least one of bilinear pairings, bilinear pairings on elliptic curves, threshold scheme, Gap Diffie-Hellman groups (GDH) or Boneh-Lynn-Shacham (BLS) scheme. In one or more embodiments, fourth protocol 215 of FIG. 8 is configured to only timestamp blocks that are validated, thereby notarizing said timestamped and validated blocks. In various embodiments, timestamps are only issued in a certain time window.

In some embodiments, the notarized block is configured to be generated by a threshold set of first group (135, $\gamma_1$), wherein a size of the threshold set is smaller than or equal to a size of first group (135, $\gamma_1$). In some embodiments, the notarized block is configured to be generated by a threshold set of second group (135, $\gamma_2$), wherein a size of the threshold set is smaller than or equal to a size of second group (135, $\gamma_2$). In some embodiments, the notarized block is configured to be generated by a threshold set of N-th group (135, $\gamma_N$), wherein a size of the threshold set is smaller than or equal to a size of N-th group (135, $\gamma_N$).

As previously discussed, remaining features of the system architecture of the plurality of protocols of threshold relay chain 700 which are configured to operate a blockchain (FIG. 8) is similar to the system architecture of the plurality of protocols of threshold relay chain 100 which are configured to operate a blockchain (FIG. 2).

Figure 9:
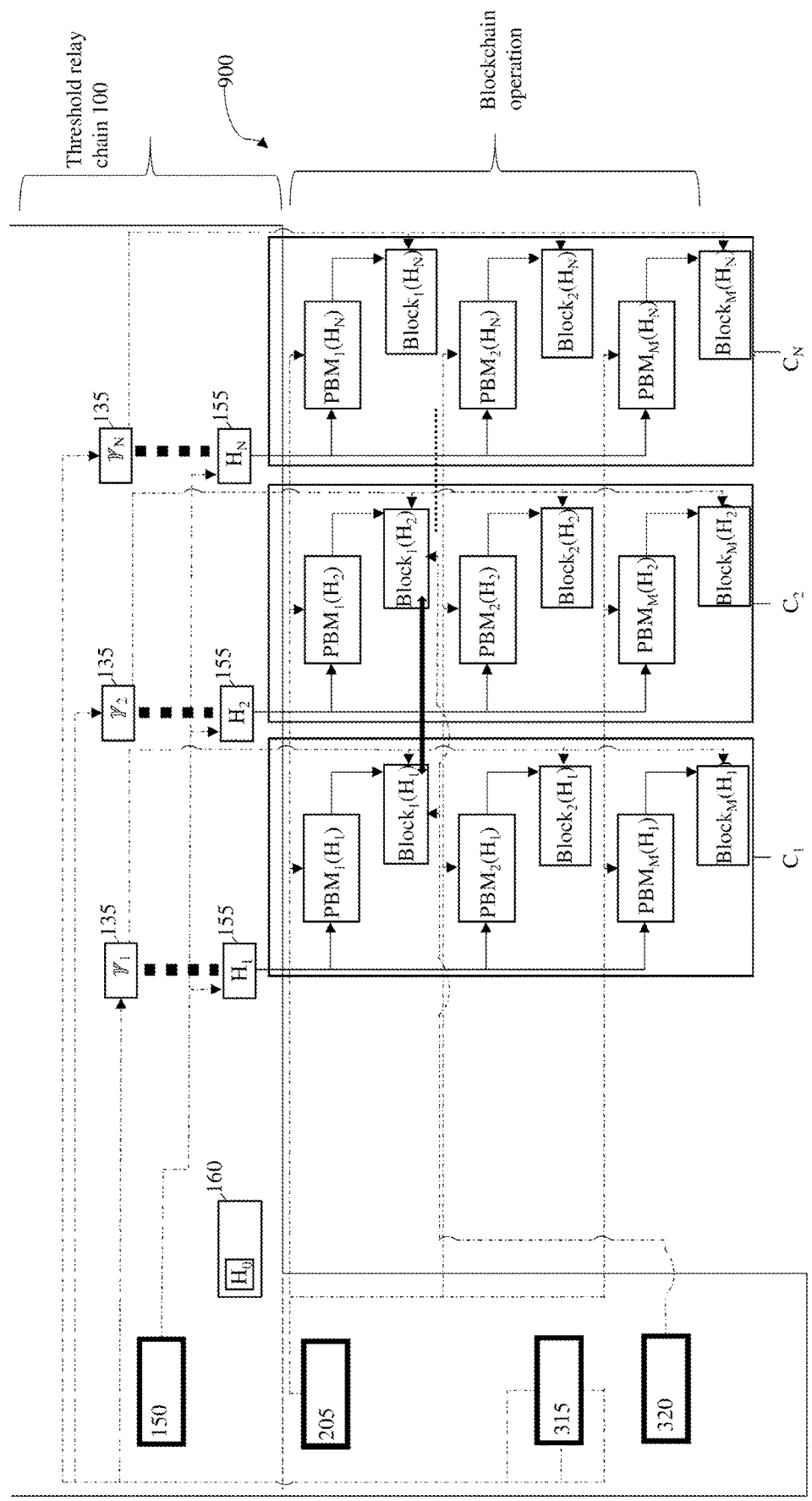
FIG. 9 illustrates a system architecture of a plurality of protocols of the threshold relay chain which are configured to validate and timestamp a block of a plurality of blocks according to one or more embodiments.

FIG. 9 illustrates a system architecture of a plurality of protocols of the threshold relay chain 700 which are configured to validate and timestamp a block of a plurality of blocks according to one or more embodiments. The system architecture of the plurality of protocols of threshold relay chain 700 (FIG. 9) is similar to the system architecture of the plurality of protocols of threshold relay chain 100 (FIG. 3). Similar elements in the system architecture of the plurality of protocols of threshold relay chain 700 (FIG. 9) have a same reference number as in FIG. 3. In comparison with FIG. 3, FIG. 9 includes a hash value (160, $H_0$), wherein hash value (160, $H_0$) of FIG. 9 does not select a plurality of block makers.

In comparison with FIG. 3, the system architecture of a plurality of protocols of the threshold relay chain 700 which are configured to validate and timestamp a block of a plurality of blocks (FIG. 9) includes a fourth protocol 315. Fourth protocol 315 of FIG. 9 is configured to designate N-th group (135, $\gamma_N$) to validate a block of a plurality of blocks within a respective cycle (for example: $C_N$) by generating a N-th secondary group signature. The N-th secondary group signature authenticates the block. In at least one embodiment, fourth protocol 315 of FIG. 9 is configured to perform the above functions contemporaneously. In various embodiments, validation of any block includes at least one of checking signatures, checking references, verifying hashes, verifying transactions, checking size, checking execution time, or checking double-spends. In at least one embodiment, fourth protocol 315 of FIG. 9 is configured to validate blocks, thereby notarizing said validated blocks.

In comparison with FIG. 3, fourth protocol 315 of FIG. 9 is configured to designate first group (135, $\gamma_1$) to validate and timestamp a block of the plurality of blocks by generating a first secondary group signature, wherein the plurality of blocks is within a respective cycle (for example: $C_1$). The first secondary group signature authenticates the block. Additionally, fourth protocol 315 of FIG. 9 is configured to designate second group (135, $\gamma_2$) to timestamp a block of the plurality of blocks by generating a second secondary group signature, wherein the plurality of blocks is within a respective cycle (for example: $C_2$). The second secondary group signature authenticates the block. Furthermore, fourth protocol 315 of FIG. 9 is configured to designate N-th group (135, $\gamma_N$) to timestamp block of the plurality of blocks by generating the N-th secondary group signature, wherein the plurality of blocks is within a respective cycle (for example: $C_N$). The N-th secondary group signature authenticates the block. In at least one embodiment, fourth protocol 315 of FIG. 9 is configured to perform the above functions contemporaneously. In various embodiments, the timestamping is based on a signature scheme, wherein the signature scheme includes at least one of bilinear pairings, bilinear pairings on elliptic curves, threshold scheme, Gap Diffie-Hellman groups (GDH) or Boneh-Lynn-Shacham (BLS) scheme. In one or more embodiments, fourth protocol 315 of FIG. 9 is configured to timestamp blocks that are validated. In one or more embodiments, fourth protocol 315 of FIG. 9 is configured to only timestamp blocks that are validated, thereby notarizing said timestamped and validated blocks. In various embodiments, timestamps are only issued in a certain time window.

In some embodiments, the notarized block is configured to be generated by a threshold set of first group (135, $\gamma_1$), wherein a size of the threshold set is smaller than or equal to a size of first group (135, $\gamma_1$). In some embodiments, the notarized block is configured to be generated by a threshold set of second group (135, $\gamma_2$), wherein a size of the threshold set is smaller than or equal to a size of second group (135, $\gamma_2$). In some embodiments, the notarized block is configured to be generated by a threshold set of N-th group (135, $\gamma_N$), wherein a size of the threshold set is smaller than or equal to a size of N-th group (135, $\gamma_N$).

The first group signature is configured to be generated by a threshold set of the first group (135, $\gamma_1$), wherein a size of the threshold set is smaller than or equal to a size of the first group. In at least one embodiment, the size of the threshold set of first group (135, $\gamma_1$) is a system parameter. The second group signature is configured to be generated by a threshold set of the second group (135, $\gamma_2$), wherein a size of the threshold set is smaller than or equal to a size of the second group. In at least one embodiment, the threshold set of second group (135, $\gamma_2$) is a system parameter. The N-th group signature is configured to be generated by a threshold set of the N-th group (135, $\gamma_N$), wherein a size of the threshold set is smaller than or equal to a size of the N-th group. In at least one embodiment, the threshold set of N-th group (135, $\gamma_N$) is a system parameter.

Again in comparison with FIG. 3, the system architecture of the plurality of protocols of threshold relay chain 700 which are configured to validate and timestamp the block of the plurality of blocks (FIG. 9) further include a fifth protocol 320, wherein fifth protocol 320 of FIG. 9 is configured to broadcast at least one of the first secondary group signature or a timestamped block within cycle $C_1$ to the network. The first secondary group signature is configured to timestamp the respective block. Additionally, fifth protocol 320 of FIG. 9 is configured to broadcast at least one of the second secondary group signature or a timestamped block within cycle $C_2$ to the network. The second secondary group signature is configured to timestamp the respective block. Furthermore, fifth protocol 320 of FIG. 9 is configured to broadcast at least one of the N-th secondary group signature or a timestamped block within cycle $C_N$ to the network. The N-th secondary group signature is configured to timestamp the respective block. In at least one embodiment, fifth protocol 320 of FIG. 9 is configured to perform the above functions contemporaneously. Any timestamped block which is broadcasted references another timestamped block of a different cycle.

As previously discussed, remaining features of the system architecture of the plurality of protocols of threshold relay chain 700 which are configured to validate and timestamp the block of the plurality of blocks (FIG. 9) is similar to the system architecture of the plurality of protocols of threshold relay chain 100 which are configured to validate and timestamp the block of the plurality of blocks (FIG. 3).

Figure 10:
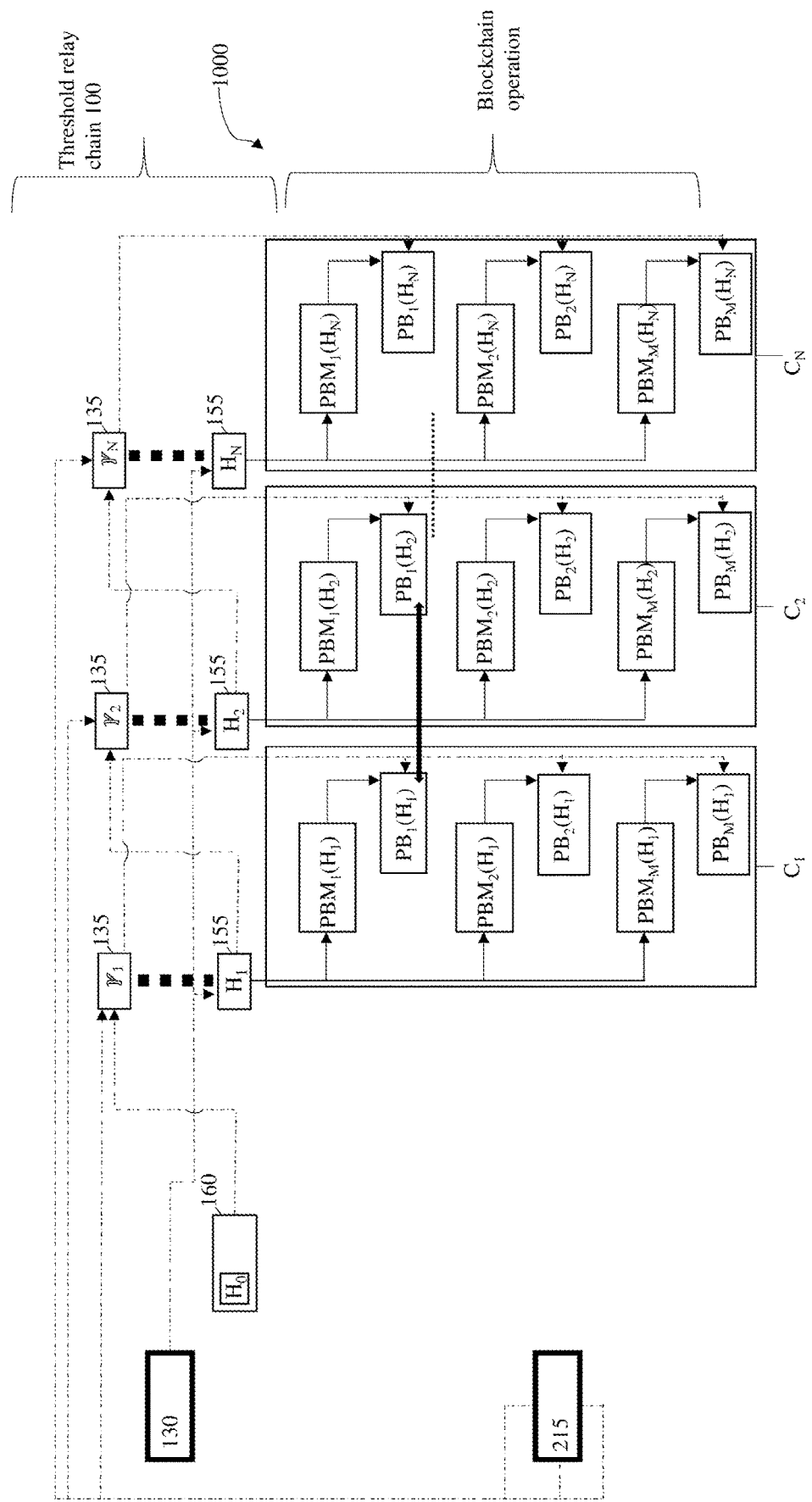
FIG. 10 illustrates a system architecture of a plurality of protocols of the threshold relay chain which are configured to sustain a systematic randomness-based block validation according to one or more embodiments.

FIG. 10 illustrates a system architecture of a plurality of protocols of threshold relay chain 700 which are configured to sustain a systematic randomness-based block validation according to one or more embodiments. The system architecture of the plurality of protocols of threshold relay chain 700 (FIG. 10) is similar to the system architecture of the plurality of protocols of threshold relay chain 100 (FIG. 4). Similar elements in the system architecture of the plurality of protocols of threshold relay chain 700 (FIG. 10) have a same reference number as in FIG. 4. In comparison with FIG. 4, FIG. 10 includes a hash value (160, $H_0$), wherein hash value (160, $H_0$) of FIG. 10 does not select a plurality of block makers.

In comparison with FIG. 4, a fourth protocol 215 of FIG. 10 is configured to designate first group (135, $\gamma_1$) to timestamp a block of the plurality of blocks, wherein the plurality of blocks is within a respective cycle (for example: $C_1$). In one or more embodiments, fourth protocol 215 of FIG. 10 is configured to designate second group (135, $\gamma_2$) to timestamp a block of the plurality of blocks, wherein the plurality of blocks is within a respective cycle (for example: $C_2$). Only after second group (135, $\gamma_2$) observes the timestamp from first group (135, $\gamma_1$) does second group (135, $\gamma_2$) create a second group signature as implicitly noted in FIG. 7. In one or more embodiments, fourth protocol 215 of FIG. 10 is configured to designate N-th group (135, $\gamma_N$) to timestamp a block of the plurality of blocks, wherein the plurality of blocks is within a respective cycle (for example: $C_N$). Only after (N+1)th group (135, $\gamma_{N-1}$) observes the timestamp from N-th group (135, $\gamma_N$) does (N+1)th group (135, $\gamma_{N+1}$) create a (N+1)th group signature as implicitly noted in FIG. 7.

As previously discussed, remaining features of the system architecture of the plurality of protocols of threshold relay chain 700 which are configured to sustain a systematic randomness-based block validation (FIG. 10) is similar to the system architecture of the plurality of protocols of threshold relay chain 100 which are configured to sustain a systematic randomness-based block validation (FIG. 4).

Figure 11:
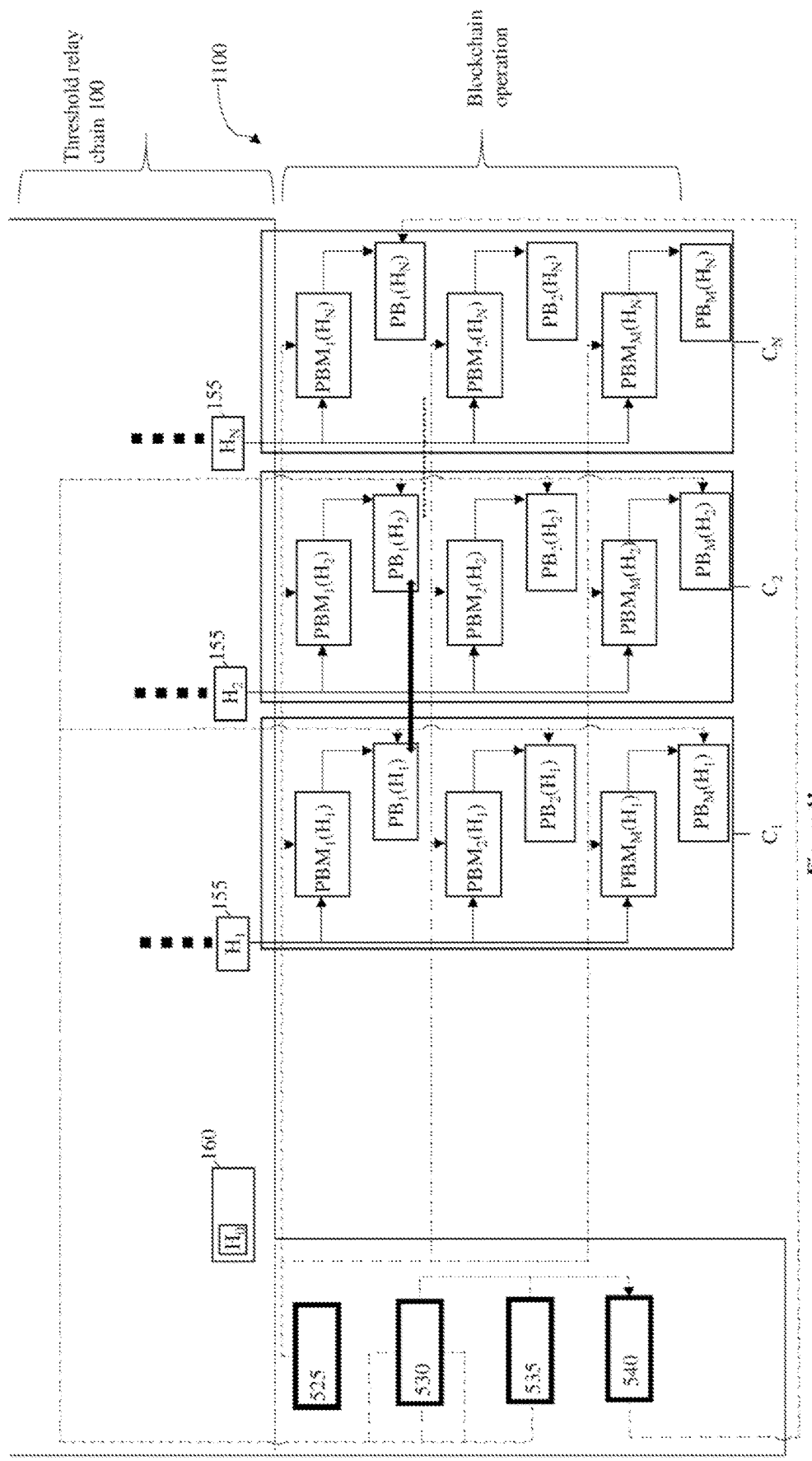
FIG. 11 illustrates a system architecture of a ranking system of the threshold relay chain according to one or more embodiments.

FIG. 11 illustrates a system architecture of a ranking system 1100 of the threshold relay chain 700 according to one or more embodiments. The system architecture of the ranking system of threshold relay chain 700 (FIG. 11) is similar to the system architecture of the ranking system of threshold relay chain 100 (FIG. 5). Similar elements in the system architecture of the ranking system of threshold relay chain 700 (FIG. 11) have a same reference number as in FIG. 5. In comparison with FIG. 5, FIG. 11 includes a hash value (160, $H_0$), wherein hash value (160, $H_0$) of FIG. 11 does not select a plurality of block makers.

The system architecture of the ranking system of threshold relay chain 700 (FIG. 11) includes an eighth protocol 525, wherein eighth protocol 525 of FIG. 11 is configured to derive a rank for each block maker of the plurality of block makers. In comparison with FIG. 5, the rank is derived from the first group signature for a respective cycle (for example: $C_1$), according to one or more embodiments. In some embodiments, the rank is derived from the second group signature for a respective cycle (for example: $C_2$). In some embodiments, the rank is derived from the N-th group signature for a respective cycle (for example: $C_N$).

As previously discussed, remaining features of the system architecture of the ranking system of threshold relay chain 700 (FIG. 11) is similar to the system architecture of the ranking system of threshold relay chain 100 (FIG. 5).

Figure 12:
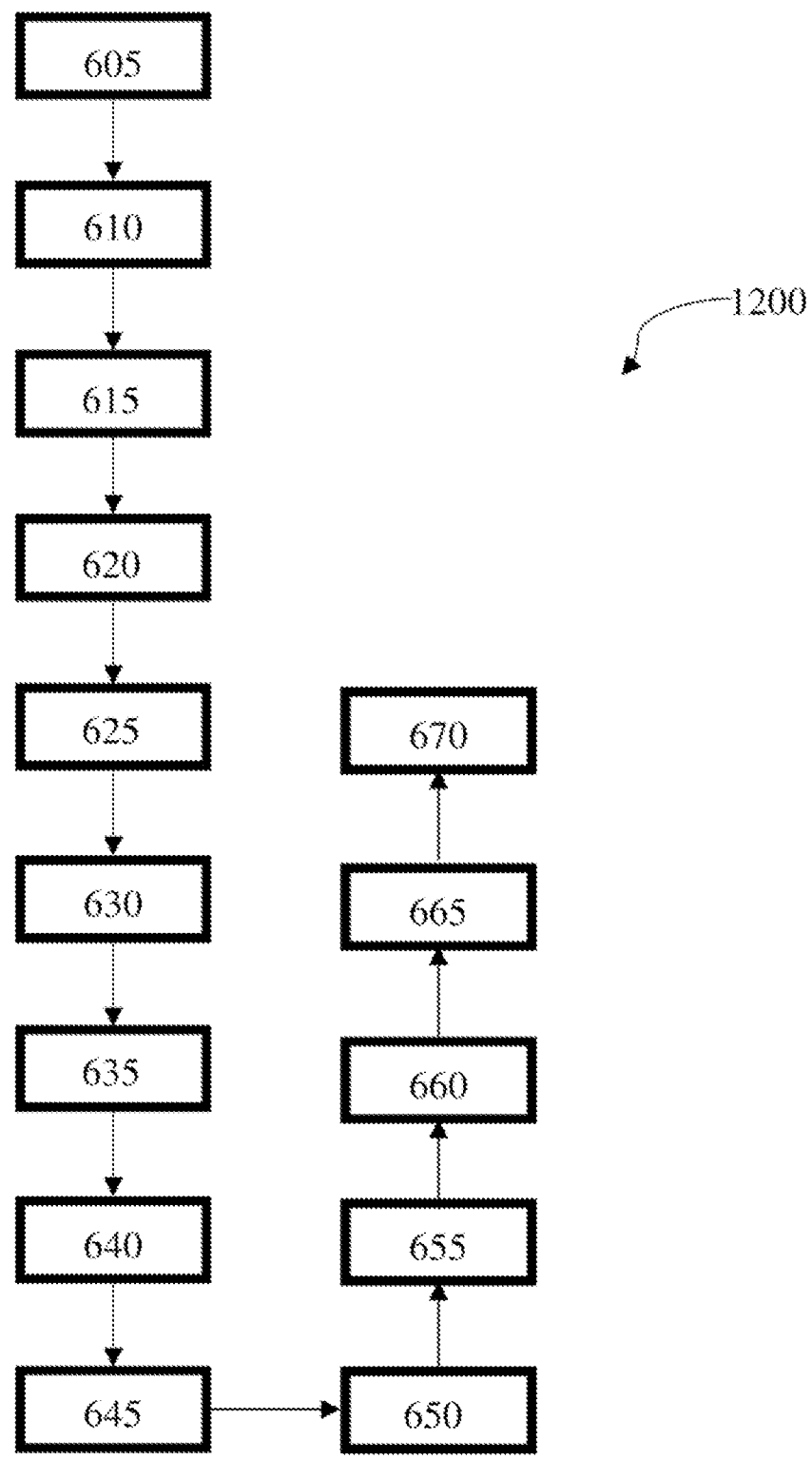
FIG. 12 is a flow-chart which illustrates a method of processing data in a system architecture according to one or more embodiments.

FIG. 12 is a flow-chart which illustrates a method 1200 of processing data in a system architecture according to one or more embodiments. A non-transitory computer-readable medium encoded with a computer-readable program which, when executed by a processor, will cause a computer to execute method 1200. Method 1200 starts off with step 605 where a plurality of nodes is nominated by a sixth protocol. Method 1200 continues with step 610 where a plurality of groups is formed by a first protocol. In at least one embodiment, each group of the plurality of groups includes a set of randomly selected nodes from a network. In some embodiments, the set of randomly selected nodes are part of the plurality of nodes.

Method 1200 continues with step 615 where any potential misbehavior of a select node of the set of randomly selected nodes and/or the plurality of nodes is detected by a seventh protocol. In one or more embodiments, the select node is penalized and/or revoke a nomination. Method 1200 continues with step 620 where a first group is randomly selected from the plurality of groups by a second protocol. In some embodiments, the first group is randomly selected by the second protocol based on a seed. In some embodiments, the first group is randomly selected by the second protocol based on a seed which is based on a preceding group signature.

Method 1200 further continues with step 625 where a group public key for the first group is established by a setup protocol. In step 630, the first group signs a first message by generating a first group signature. In one or more embodiment, a third protocol is configured to designate the first group to sign the first message. Furthermore, method 1200 continues with step 635 where a hash value is generated from the first group signature. In one or more embodiments, a hash function is configured to generate the hash value from the first group signature.

Method 1200 continues with step 640 where the hash value along with the second protocol is configured to select a second group for a subsequent cycle. In one or more embodiments, the second group of the subsequent cycle continues with steps which are analogous to step 625 and onwards of method 1200, only after a block of the plurality of blocks is at least one of validated or timestamped by a fourth protocol, as indicated in step 670 of the preceding cycle which is discussed below. In at least one embodiment, the second group signs a second message only after the second group observes the block of the plurality of blocks being at least one of validated or timestamped.

Referring back to the preceding cycle, method 1200 continues with step 645 where a plurality of block makers is selected by the hash value. Additionally, method 1200 includes step 650 where each block maker of the plurality of block makers is prioritized by a twelfth protocol. In at least one embodiment, the twelfth protocol is configured to prioritize the each block maker of the plurality of block makers based on a ranking system. In some embodiments, the ranking system includes ranking system 1100 as illustrated in FIG. 11. Method 1200 continues with step 655 where each block of the plurality of blocks within a respective cycle are prioritized by a thirteenth protocol. Method 1200 additionally continues with step 660 where a block of the plurality of blocks is timestamped by the fourth protocol. In at least one embodiment, the fourth protocol is configured to designate the first group to timestamp the block of the plurality of blocks in the respective cycle (for example: $C_1$). In some embodiments, fourth protocol only timestamps blocks that are prioritized. In some embodiments, fourth protocol timestamps blocks, irrespective as to whether they are prioritized. In some embodiments, the timestamp is created using a secondary group signature.

Furthermore, method 1200 continues with step 665 where a block of the plurality of blocks is validated by the fourth protocol. In at least one embodiment, the fourth protocol is configured to designate the first group to validate the block of the plurality of blocks using the secondary group signature. In some embodiments, only prioritized block is validated. In some embodiments, the plurality of blocks is validated irrespective of their priority. In some embodiments, only validated block is timestamped. In some embodiments, only timestamped block is validated.

Method 1200 further continues with step 670 where at least one of the secondary group signature or a timestamped block within the respective cycle is broadcasted by a fifth protocol.

One of ordinary skill in the art would recognize that operations are added or removed from method 1200, in one or more embodiments. One of ordinary skill in the art would also recognize that the order of the operations in method 1200 is varied in various alternative embodiments.

Figure 13:
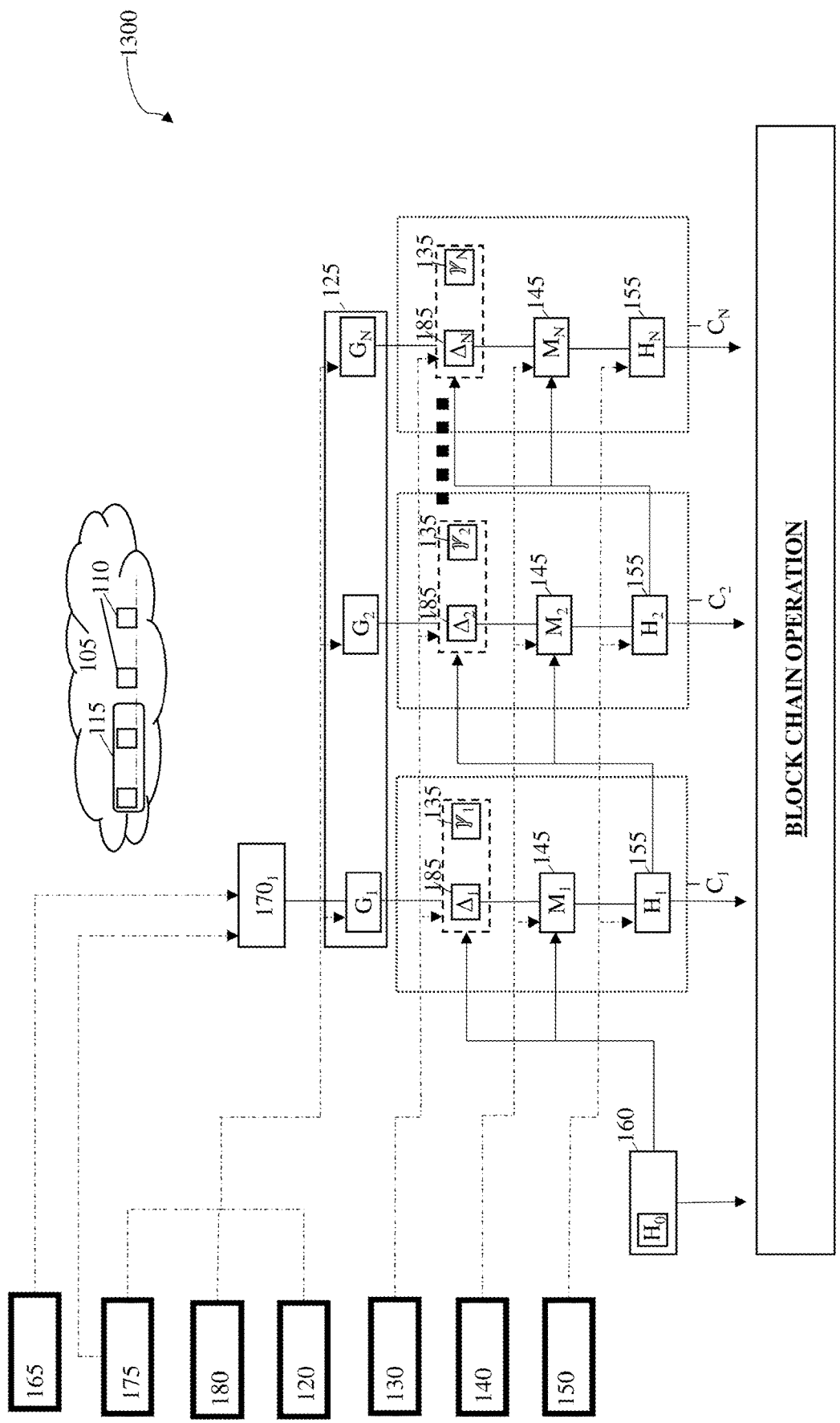
FIG. 13 illustrates a system architecture of a threshold relay chain according to one or more embodiments.

FIG. 13 illustrates a system architecture of a threshold relay chain 1300 according to one or more embodiments. The system architecture of threshold relay chain 1300 (FIG. 13) is similar to threshold relay chain 100 (FIG. 1). Similar elements in threshold relay chain 1300 (FIG. 13) have a same reference number as in FIG. 1. In comparison with FIG. 1, FIG. 13 includes a second protocol 130 which is configured to randomly select a first delta group (185, $\Delta_1$) and a first group (135, $\gamma_1$).

A third protocol 140 of FIG. 13 is configured to designate first delta group (185, $\Delta_1$) to sign a first message (145, $M_1$) by generating a first group signature. A hash function 150 of FIG. 13 is configured to generate a hash value (155, $H_1$) from the first group signature. A size of first group (185, $\Delta_1$) is a system parameter. In at least one embodiment, hash value (155, $H_1$) is configured to select a second delta group (185, $\Delta_2$) using second protocol 130, where third protocol 140 is configured to designate second delta group (185, $\Delta_2$) to sign a second message (145, $M_2$)

In various embodiments, the first group signature is configured to be generated by a threshold set of first delta group (185, $\Delta_1$). In some embodiments, the threshold set is smaller than a size of first delta group (185, $\Delta_1$). In some embodiments, the threshold set is equal to a size of first delta group (185, $\Delta_1$). In at least one embodiment, the threshold set of first delta group (185, $\Delta_1$) is a system parameter.

As previously discussed, second protocol 130 is configured to randomly select first delta group (185, $\Delta_1$). In various embodiments, such selection is based on a random number. In some embodiments, the random number is a value derived from a seed 160. In some embodiments, seed 160 is derived from the preceding group signature. In at least one embodiment, the derivation of seed 160 from the preceding group signature is by hash function 150.

Threshold relay chain 1300 of FIG. 13 further includes a setup protocol 180, wherein setup protocol 180 is configured to establish a group public key for the group of the plurality of groups 125 formed by first protocol 120, wherein the first group signature is configured to be validated by the group public key. In at least one embodiment, the first group signature is configured to be unique to the group public key and first message (145, $M_1$), irrespective to idiosyncrasies of the threshold set of first delta group (185, $\Delta_1$). In some embodiments, the first group signature is based on at least one of bilinear pairings, bilinear pairings on elliptic curves, threshold scheme, Gap Diffie-Hellman groups (GDH) or Boneh-Lynn-Shacham (BLS) signature scheme.

In one or more embodiments, setup protocol 180 of FIG. 13 is configured to establish an individual private key share for each node of each group (125; $G_1, G_2 \ldots G_N$) of plurality of groups 125. According to at least one embodiment, the individual private key shares of each of the nodes of a threshold set of first delta group (185, $\Delta_1$) are configured to be used for generating the first group signature. In some embodiments, the threshold set is smaller than a size of first delta group (185, $\Delta_1$). In some embodiments, the threshold set is equal to a size of first delta group (185, $\Delta_1$). In at least one embodiment, the threshold set of first delta group (185, $\Delta_1$) is a system parameter.

As illustrated in FIG. 13, various protocols and functions of threshold relay chain 1300 are configured to cater to multiple cycles (i.e. $C_1, C_2 \ldots C_N$) of data management and processing contemporaneously. Second protocol 130 along with hash value (155, $H_1$) are configured to select second delta group (185, $\Delta_2$), where third protocol 140 is configured to designate second delta group (185, $\Delta_2$) to sign a second message (145, $M_2$). In some embodiments, second message (145, $M_2$) includes hash value (155, $H_1$) of the first group signature. In some embodiments, second message (145, $M_2$) is devoid of hash value (155, $H_1$) of the first group signature.

According to one or more embodiments, second protocol 130 along with hash value (155, $H_N$) are configured to select (N+1)th delta group (185, $\Delta_{N+1}$), where third protocol 140 is configured to designate (N+1)th delta group (185, $\Delta_{N+1}$) to sign (N+1)th message (145, $M_{N+1}$). Hash function 150 is configured to generate a hash value (155, $H_{N+1}$) from the (N+1)th group signature. In some embodiments, (N+1)th message (145, $M_{N+1}$) includes hash value (155, $H_N$) of the N-th group signature. In some embodiments, (N+1)th message (145, $M_{N+1}$) is devoid of hash value (155, $H_N$) of the N-th group signature.

As previously discussed, remaining features of the system architecture of threshold relay chain 1300 (FIG. 13) is similar to the system architecture of the threshold relay chain 100 (FIG. 1). In at least one embodiment, FIGS. 2-6 and the associated description of the current application is combined with the system architecture of threshold relay chain 1300 (FIG. 13).

Figure 14:
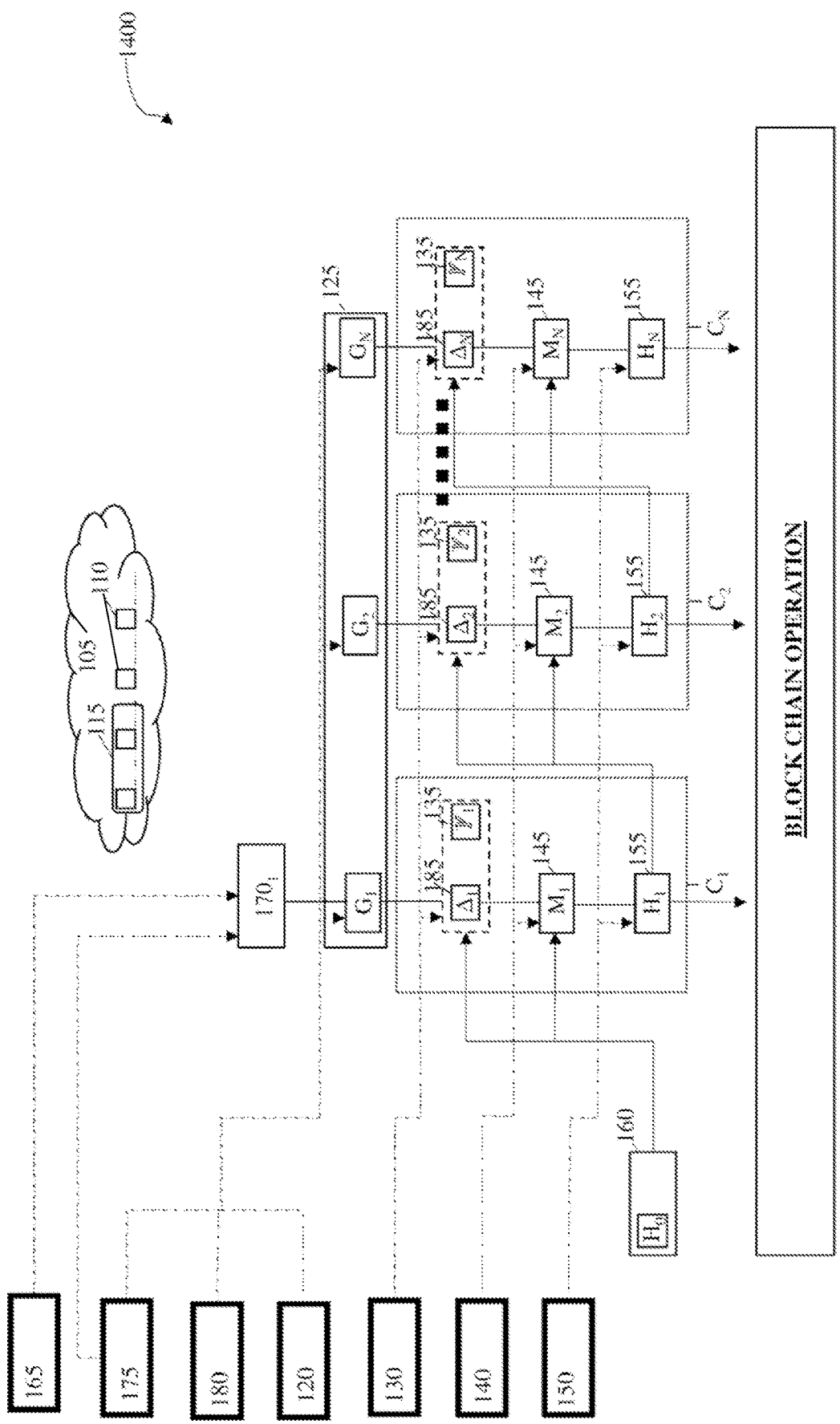
FIG. 14 illustrates a system architecture of a threshold relay chain according to one or more embodiments.

FIG. 14 illustrates a system architecture of a threshold relay chain 1400 according to one or more embodiments. The system architecture of threshold relay chain 1400 (FIG. 14) is similar to threshold relay chain 1300 (FIG. 13). Similar elements in threshold relay chain 1400 (FIG. 14) have a same reference number as in FIG. 13. In comparison with FIG. 13, FIG. 14 includes a hash value (160, $H_0$), wherein hash value (160, $H_0$) of FIG. 14 does not select a plurality of block makers.

As previously discussed, remaining features of the system architecture of the threshold relay chain 1400 (FIG. 14) is similar to the system architecture of the threshold relay chain 1300 (FIG. 13). In at least one embodiment, FIGS. 8-12 and the associated description of the present application is combined with the system architecture of threshold relay chain 1400 (FIG. 14).

Figure 15:
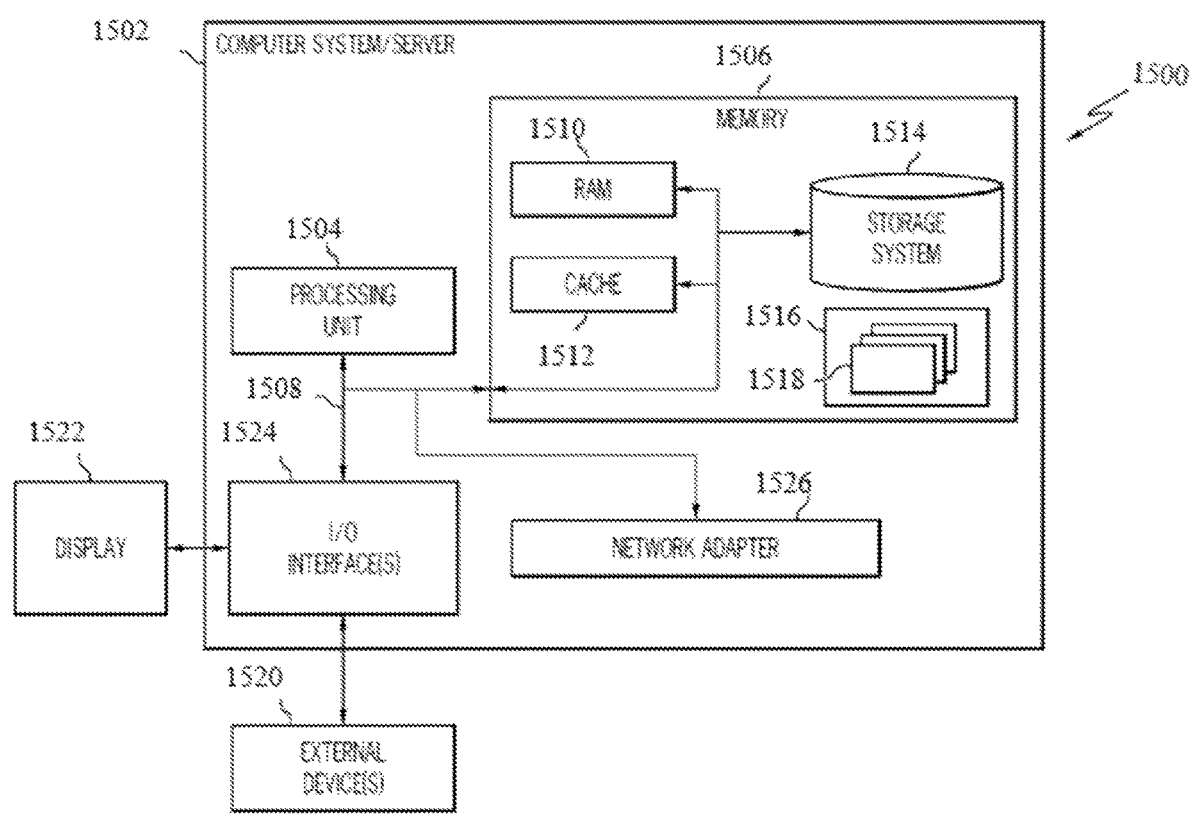
FIG. 15 illustrates one example of a computing or processing node for operating a node in a blockchain.

FIG. 15 illustrates one example of a computing or processing node 1500 for operating a node in a blockchain. This is not intended to suggest any limitation as to the scope of use or functionality of embodiments of the invention described herein. Regardless, the computing node 1500 is capable of being implemented and/or performing any of the functionality set forth hereinabove.

In computing node 1500 there is a computer system/server 1502, which is operational with numerous other general purpose or special purpose computing system environments or configurations. Examples of well-known computing systems, environments, and/or configurations that may be suitable for use with computer system/server 1502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 1502 in cloud computing node 1500 is shown in the form of a general-purpose computing device. The components of computer system/server 1502 may include, but are not limited to, one or more processors or processing units 1504, a system memory 1506, and a bus 1508 that couples various system components including system memory 1506 to processor 1504.

Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506, in one embodiment, implements the flow-charts of FIG. 6 and FIG. 12, and the architectures of FIGS. 1-5, FIGS. 7-11, and FIGS. 13-14. The system memory 506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of various embodiments of the invention.

Program/utility 1516, having a set (at least one) of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 1502 may also communicate with one or more external devices 1520 such as a keyboard, a pointing device, a display 1522, etc.; one or more devices that enable a user to interact with computer system/server 1502; and/or any devices (e.g., network card, modem, etc.) that enable computer system/server 1502 to communicate with one or more other computing devices. Such communication can occur via I/O interfaces 1524. Still yet, computer system/server 1502 can communicate with one or more networks such as a local area network (LAN), a general wide area network (WAN), and/or a public network (e.g., the Internet) via network adapter 1526. As depicted, network adapter 1526 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A software architecture encoded on a non-transitory computer readable medium, the software architecture comprising:
    a first protocol, wherein the first protocol is configured to form a plurality of groups, wherein each group of the plurality of groups comprises a set of randomly selected nodes from a network;
    a creation protocol, wherein the creation protocol is configured to create a plurality of dealing messages, wherein each dealing message of the plurality of dealing messages comprises information from each dealer node in a selected group of the plurality of groups;
    a hash function, wherein the hash function is configured to generate a hash value from the each dealing message of the plurality of dealing messages;
    a second protocol, wherein the second protocol is configured to randomly select a notary group from the plurality of groups;
    a fifth protocol, wherein the fifth protocol is configured to broadcast a plurality of blocks to a network, wherein each block of the plurality of blocks comprises a dealing message of the plurality of dealing messages;
    a fourth protocol, wherein the fourth protocol is configured to notarize the each block of the plurality of blocks, wherein the notary group is configured to use the fourth protocol; and
    a reading protocol, wherein the reading protocol is configured to read the dealing message to a receiver node of the selected group, wherein the receiver node is different from a dealer node whose information is contained in the corresponding dealing message; and
    a verification protocol, wherein the verification protocol is configured to verify veracity of the corresponding dealing message, wherein the verification protocol is configured to be run by the receiver node.

2. The software architecture of claim 1, wherein the creation protocol is configured to be run by each dealer node of the selected group.

3. The software architecture of claim 1, wherein the reading protocol is configured to be run by each receiver node of the selected group.

4. The software architecture of claim 1, wherein the first group comprises the selected group.

5. The software architecture of claim 1, wherein the verification protocol is configured to verify an encrypted key share from the dealer node relative to a verification vector, wherein the information in the corresponding dealing message comprises the encrypted key share from the dealer node and the verification vector.

6. The software architecture of claim 5, wherein the verification protocol run by the receiver node is configured to verify the encrypted key share from the dealer node relative to the verification vector of the dealer node.

7. The software architecture of claim 6, further comprising a complaint protocol, wherein the complaint protocol is configured to generate a complaint message, wherein the complaint message is signed by the receiver node, and wherein the complaint protocol is configured to be run by the receiver node.

8. The software architecture of claim 7, wherein the complaint message comprises data regarding a lack of verification of the encrypted key share relative to the verification vector.

9. The software architecture of claim 7, wherein the fifth protocol is configured to broadcast the complaint message to the network.

10. The software architecture of claim 9, further comprising a justification protocol, wherein the justification protocol is configured to create a justification message, wherein the justification message comprises justifications to the complaint message, wherein the dealer node is configured to run the justification protocol to create the justification message.

11. The software architecture of claim 10, wherein the fifth protocol is configured to broadcast the justification message to the network.

12. The software architecture of claim 11, wherein the verification protocol is configured to verify veracity of the justification message relative to the verification vector, wherein the verification protocol is configured to be run by a verifying node.

13. The software architecture of claim 12, wherein the verification protocol rejects veracity of the justification message.

14. The software architecture of claim 13, further comprising the creation protocol, wherein the creation protocol is configured to create a plurality of second dealing messages, wherein each second dealing message of the plurality of second dealing messages comprises information about each dealer node in a second selected group of the plurality of groups.

15. The software architecture of claim 12, wherein the verification protocol accepts veracity of the justification message.

16. The software architecture of claim 15, further comprising a registration protocol, wherein the registration protocol is configured to consolidate confirmation of a plurality of justified public keys, wherein each justified public key of the plurality of justified public keys corresponds to the each dealing message, wherein the verification protocol has accepted veracity of each justified public key of the plurality of justified public keys.

17. The software architecture of claim 16, wherein the registration protocol is run by the verifying node.

18. The software architecture of claim 16, wherein the fifth protocol is configured to broadcast a consolidated confirmation to the network.

19. The software architecture of claim 1, further comprising a registration protocol, wherein the registration protocol is configured to consolidate a plurality of dealing messages of the selected group, wherein the registration protocol is run by the each receiver node.

20. The software architecture of claim 1, further comprising a second protocol, wherein the second protocol is configured to randomly select a notary group from the plurality of groups, wherein the notary group is configured to use the fourth protocol.

21. A software architecture encoded on a non-transitory computer readable medium, the software architecture comprising:

a first protocol, wherein the first protocol is configured to form a plurality of groups, wherein each group of the plurality of groups comprises a set of randomly selected nodes from a network;

a creation protocol, wherein the creation protocol is configured to create a plurality of dealing messages, wherein each dealing message of the plurality of dealing messages comprises information from each dealer node in a selected group of the plurality of groups;

a fifth protocol, wherein the fifth protocol is configured to broadcast a plurality of blocks to a network, wherein each block of the plurality of blocks comprises a dealing message of the plurality of dealing messages;

a reading protocol, wherein the reading protocol is configured to read the dealing message to a receiver node of the selected group, wherein the receiver node is different from a dealer node whose information is contained in the corresponding dealing message a verification protocol, wherein the verification protocol is configured to verify veracity of the corresponding dealing message, wherein the verification protocol is configured to be run by the receiver node;

a complaint protocol, wherein the complaint protocol is configured to generate a complaint message, wherein the complaint message is signed by the receiver node, and wherein the complaint protocol is configured to be run by the receiver node;

a justification protocol, wherein the justification protocol is configured to create a justification message, wherein the justification message comprises justifications to the complaint message, wherein the dealer node is configured to run the justification protocol to create the justification message; and a registration protocol, wherein the registration protocol is configured to consolidate confirmation of a plurality of justified public keys, wherein each justified public key of the plurality of justified public keys corresponds to the each dealing message, wherein the verification protocol has accepted veracity of each justified public key of the plurality of justified public keys;

wherein the verification protocol is configured to verify veracity of the justification message relative to the verification vector, wherein the verification protocol is configured to be run by a verifying node and the verification protocol accepts or rejects veracity of the justification message.

22. The software architecture of claim 21, wherein the creation protocol is configured to be run by each dealer node of the selected group.

23. The software architecture of claim 21, wherein the reading protocol is configured to be run by each receiver node of the selected group.

24. The software architecture of claim 21, further comprising:

a second protocol, wherein the second protocol is configured to select a first group from the plurality of groups formed by the first protocol.

25. The software architecture of claim 24, wherein the first group comprises the selected group.

26. The software architecture of claim 21, wherein the verification protocol is configured to verify an encrypted key share from the dealer node relative to a verification vector, wherein the information in the corresponding dealing message comprises the encrypted key share from the dealer node and the verification vector.

27. The software architecture of claim 26, wherein the verification protocol run by the receiver node is configured to verify the encrypted key share from the dealer node relative to the verification vector of the dealer node.

28. The software architecture of claim 26, wherein the complaint message comprises data regarding a lack of verification of the encrypted key share relative to the verification vector.

\* \* \* \* \*